United States Patent
Horton et al.

(10) Patent No.: US 6,230,740 B1
(45) Date of Patent: May 15, 2001

(54) HYDRAULIC TOOL LATCH BRACKET

(76) Inventors: Lee A. Horton, 19 Main St.; Arthur A. Erickson, 51 Pitcherville Rd., both of Hubbardston, MA (US) 01452

(*) Notice: Subject to any disclaimer, the term of this patent is extended or adjusted under 35 U.S.C. 154(b) by 0 days.

(21) Appl. No.: 09/431,739

(22) Filed: Nov. 1, 1999

Related U.S. Application Data

(62) Division of application No. 09/124,637, filed on Jul. 29, 1998.

(51) Int. Cl.[7] ................................................ F16L 29/00
(52) U.S. Cl. ........................ 137/614; 137/614.03; 285/39
(58) Field of Search .......................... 137/614, 614.02, 137/614.04, 614.03, 614.06; 285/39

(56) References Cited

U.S. PATENT DOCUMENTS

| | | |
|---|---|---|
| 2,928,420 | 3/1960 | Kamenetzky et al. . |
| 3,211,178 | 10/1965 | Kiszko . |
| 3,527,480 | 9/1970 | Larson . |
| 3,873,062 | 3/1975 | Johnson et al. . |
| 3,976,099 | 8/1976 | Russell . |
| 4,114,853 | 9/1978 | Medvick . |
| 4,211,253 | 7/1980 | Ekman . |
| 4,490,073 | 12/1984 | Lawson . |
| 4,615,546 | 10/1986 | Nash et al. . |
| 4,637,432 | 1/1987 | Medvick et al. . |
| 4,809,747 | 3/1989 | Choly et al. .......... 137/614.06 |
| 4,913,316 | 4/1990 | Richter . |
| 4,938,509 | 7/1990 | LaPlante . |
| 5,014,743 | 5/1991 | Makishima . |
| 5,148,861 | 9/1992 | Colvin et al. . |
| 5,342,098 | 8/1994 | Wilkins . |
| 5,476,379 | 12/1995 | Disel . |
| 5,540,250 | 7/1996 | Mullins . |
| 5,544,858 | 8/1996 | Rogers et al. . |
| 5,974,706 | * 11/1999 | Kaczmarski et al. .......... 37/468 |

FOREIGN PATENT DOCUMENTS

| | | |
|---|---|---|
| 40-14301 | 5/1940 | (JP) . |
| 53-27761 | 7/1978 | (JP) . |
| 58-158892 | 10/1983 | (JP) . |
| 59-65062 | 4/1984 | (JP) . |
| 61-23571 | 7/1986 | (JP) . |
| 1-279194 | 11/1989 | (JP) . |
| 4-113393 | 10/1992 | (JP) . |
| 5-311689 | 11/1993 | (JP) . |

OTHER PUBLICATIONS

Parker, "Coupling Assembly," Ref. FF–750–16FO Schematic, Quick Coupling Div., NB, May 22, 1996 Dwg. No. 9605–079, Drawn by K. Brady.
Holmbury, Ltd., Company Brochure, "Bulkhead Mounted," Published in England Hydra Force, "Load Shuttle, Ball–Type, Down–Hole Mount," Ref. LS04–B30 Schematic.
Volvo BM Company, "Automatic Hose Coupling (AHC) of Attachments for Volvo BM Loaders," Press Info., Dec. 16, 1986.
Soneruds, "OilQuick," Company Brochure, Published in Sweden.
Translation into English language of an Office Action and Citation of References in corresponding Japanese Patent Appln. 11–214324 (mailed Apr. 25, 2000).
English translation of communication from JPO mailed Oct. 3, 2000 for corresponding JP Hei 11–214324 (2 pp).

* cited by examiner

*Primary Examiner*—Kevin Lee
(74) *Attorney, Agent, or Firm*—Fish & Richardson P.C.

(57) ABSTRACT

A latch bracket for attachment to a hydraulically operated tool having a hydraulic mechanism, the latch bracket includes a first fluid channel extending therethrough, with a first port coupled to the first fluid channel for coupling the first fluid channel to the hydraulic mechanism. The latch bracket receives a male latch pin on a tool coupler to lock the tool to the tool coupler and to couple the first fluid channel to a source of hydraulic pressure through the latch pin.

10 Claims, 15 Drawing Sheets

HYDRAULIC TOOL LATCH BRACKET

This is a divisional application of U.S. application Ser. No. 09/124,637, filed Jul. 29, 1998, the entire disclosure of which is incorporated herein by reference.

BACKGROUND OF THE INVENTION

The invention relates to fluid connectors, and, in particular, to a multi-line hydraulic connector adapted for se in a tool coupler used with excavation, demolition and construction equipment.

Some types of construction equipment, such as backhoes or excavators, include a movable dipper stick (also referred to as an arm) to which a variety of tools, such as buckets, grapples, hammers and the like, can be attached. A hydraulic bucket cylinder coupled to the attached tool at a link pivot rotates the tool about a dipper pivot at the free end of the dipper stick. The bucket cylinder and a linkage to the link pivot are located on a distal (forward) side of the dipper stick relative to the cab where the operator sits. To simplify the process of changing tools, a tool coupler can be permanently attached to the dipper pivot and the link pivot. A selected tool can then be removably attached to the coupler with a locking mechanism. The locking mechanism, in some cases, includes a locking pin on the tool coupler that engages a mating receptacle in the tool.

There is a trend in the industry to use an actuated quick-disconnect tool coupler for automatically connecting and disconnecting a tool. Co-owned U.S. Pat. No. 5,727, 342, to Horton, describes a quick-disconnect tool coupler that includes a latch pin biased by a spring to a forward locking position. The latch pin is retracted by extending a hydraulic latch pin cylinder located in the coupler. With this type of tool coupler, the equipment operator can switch tools without leaving the cab of the equipment.

Some tools include a hydraulically actuated mechanism. For example, some grapple attachments include a hydraulic cylinder for opening and closing the grapple jaws. The tool hydraulics typically require two hydraulic connections between the tool hydraulics and hydraulic lines extending to the end of the dipper stick. In presently available systems, these connections must be made manually. This reduces the efficiencies of the hydraulically actuated quick-disconnect tool coupler systems, because the equipment operator must leave the cab to make the connections or a second worker must be available to do so.

SUMMARY OF THE INVENTION

The invention features a non-spill, multi-line fluid connector with a plurality of separate, substantially coaxial flow paths. The fluid connector can be incorporated into a latch pin assembly of a quick-connect tool coupler.

The connector design does not compromise the latching mechanism of the quick coupler. The latching mechanism includes a latch pin in the tool coupler and a latch bracket that receives the latch pin in the tool. The latch pin is spring applied, and hydraulically released from the latch bracket. Each of the latch pin and latch bracket includes longitudinally movable internal parts that provide a pair of coaxial fluid channels. These parts cooperate when the latch pin is inserted into the latch bracket to provide connections between the pairs of channels. The invention allows tools and existing couplers to be easily converted to the new system. An equipment operator can connect a hydraulically actuated tool to the tool coupler, including all hydraulic connections, without leaving the cab of the equipment. The fluid connector includes a locking mechanism that enhances the overall safety of the equipment by inhibiting accidental release of the hydraulic tool when pressure is hydraulic pressure is applied to hydraulic actuator in the tool.

According to one aspect of the invention, a fluid connector includes a first part having a distal end and a second part having a proximal end adapted to be removably connected to the distal end of the first part. The first part includes first and second fluid channels extending within the first part from respective first and second end seals at the distal end and couple to respective first and second fluid ports. The end seals close off the first and second fluid channels when the first part is disconnected from the second part. The second part includes first and second fluid channels extending within the second part from respective first and second end seals at the proximal end and couple to respective first and second fluid ports. The end seals of the second part close off the first and second fluid channels of the second part when the first part is disconnected from the second part. Connecting the first part to the second part connects the first fluid channels of the first and second parts and also connects the second fluid channels of the first and second parts.

The first and second fluid channels of one or both of the first part and the second part can be arranged concentrically. With this feature, the first and second parts are cooperatively structured to permit the first and second parts to rotate relative to each other while connected together. In one embodiment, the second fluid channel of the first part includes an outer channel arranged concentrically around the inner, first channel of the first part, and the second fluid channel of the second part includes an outer channel arranged concentrically around the inner channel of the second part. The inner channel of the first part can be a central channel arranged on a central axis of the first part.

The first and second parts can be adapted to connect together with make-before-break seals such that the first end seal of one of the first and second parts establishes a seal with the other of the first and second parts before the first end seal of the other of the first and second parts opens, and such that the second end seal of the one of the first and second parts establishes a seal with the other of the first and second parts before the second end seal of the other of the first and second parts opens.

The first part can be constructed to include the following features: An elongated pin body has a central bore extending from the distal end to near a proximal end, and a pin head at the proximal end of the pin body. The pin head includes the first and second ports of the first part, wherein first and second connecting channels communicate between the first and second ports, respectively and the central bore. The bore has a pin central opening surface, which includes, at a distal end, a cylindrical distal portion and a tapered portion sloping radially inward toward the cylindrical distal portion, and which also includes, at a proximal end, a cylindrical proximal portion having a smaller diameter than the cylindrical distal portion of the pin central opening surface. The cylindrical distal portion and the tapered portion of the pin central opening surface can be on a pin outer sleeve that is substantially fixed in position at a distal end of the pin body. The first part also includes a tube having a proximal outer surface positioned adjacent the cylindrical proximal portion of the pin central opening surface. The tube is positioned such that it divides between the central channel and the outer channel. The first connecting channel communicates with the central channel and the second connecting channel communicates with the outer channel. A pin proximal seal is arranged to provide a seal between the proximal outer surface of the tube and the cylindrical proximal portion of the pin central opening surface. A pin inner sleeve includes a cylindrical surface at a proximal end adapted to slide along a cylindrical surface at a distal end of the tube. An outer surface of the pin inner sleeve has a cylindrical distal portion adapted to slide along the cylindrical distal portion of the pin central opening surface, and a tapered portion adapted to fit against the tapered portion of the pin central opening surface. An inner surface of the pin inner sleeve has a cylindrical distal portion and a tapered portion sloping radially inward toward the cylindrical distal portion of the inner surface of the pin inner sleeve. The second end seal of the first part includes a seal located between the cylindrical distal portion of the outer surface of the pin inner sleeve and the cylindrical distal portion of pin central opening surface. A pin outer bias member is arranged to urge the tapered portion of the outer surface of the pin inner sleeve against the tapered portion of the pin central opening surface. A pin middle seal is arranged to provide a seal between the cylindrical surface at the proximal end of the pin inner sleeve and the cylindrical surface at the distal end of the tube. A plug has a cylindrical distal surface adapted to slide along the cylindrical distal portion of the inner surface of the pin inner sleeve, and a tapered surface adapted to fit against the tapered portion of the inner surface of the pin inner sleeve. The first end seal of the first part is located between the cylindrical distal surface of the plug and the cylindrical distal portion of the inner surface of the pin inner sleeve. A pin inner bias member is arranged to urge the tapered portion of the outer surface of the plug against the tapered portion of the inner surface of the pin inner sleeve. Thus, in this arrangement of the first part, the central channel is defined by an inner surface of the tube, the inner surface of the pin inner sleeve, the plug, and the first end seal of the first part. The outer channel of the first part is defined by the pin central opening surface, the outer surface of the tube the outer surface of the pin inner sleeve, and the second end seal. The pin proximal seal and the pin middle seal provide seals between the central channel and the outer channel.

The second part can include one or more of the following additional features. An elongated plunger extends proximally from a bracket body a first distance and has an outwardly sloped surface near a proximal end. A substantially annular inner section member extends proximally from the bracket body a second distance that is less than the first distance. The inner section member is arranged substantially concentrically around the plunger and includes a cylindrical surface. A substantially annular outer section member extends proximally from the bracket body a third distance that is less than the first distance and greater than the second distance. The outer section member is arranged concentrically around the inner section member and includes a cylindrical surface. A bracket inner sleeve has an inner surface with an outwardly sloped portion at a proximal end adapted to fit against the outwardly sloped surface of the plunger. The bracket inner sleeve also has an outer surface with an outwardly sloped portion near a distal end, and a cylindrical surface at a distal end that slidingly engages with the cylindrical surface of the inner section member. The end seal of the inner channel of the second part is provided between the outwardly sloped portion of the inner surface of the bracket inner sleeve and the outwardly sloped surface of the plunger. The inner channel of the second part, which is substantially annular shape, is defined by the plunger, an inner surface of the inner section member and the inner surface of the inner sleeve. A bracket inner middle seal is arranged to seal between the cylindrical surface of the inner section member and the cylindrical surface of the bracket inner sleeve. A bracket second sleeve has an inner surface having an outwardly sloped portion at a proximal end adapted to fit against the outwardly sloped surface of the outer surface of the inner sleeve, and a cylindrical surface at a distal end that slidingly engages with the cylindrical surface of the inner section member. The end seal of the outer channel of the second part is provided between the outwardly sloped portion of the inner surface of the bracket second sleeve and the outwardly sloped surface of the outer surface of the bracket inner sleeve. The outer channel of the second part is defined by an outer surface of the inner section member, an outer surface of the bracket inner sleeve, the inner surface of the bracket second sleeve, and an inner surface of the outer section member. The bracket inner middle seal seals between the inner channel and the outer channel of the first part. A bracket outer middle seal is arranged to seal between the cylindrical surface of the outer section member and the cylindrical surface of the bracket second sleeve. A bracket bias member is arranged to urge the bracket second sleeve proximally against the bracket inner sleeve and the bracket inner sleeve against the plunger.

In addition, the bracket body can further include a cylindrical bearing at a proximal end adapted to receive the pin body such a distal face of the plug first contacts a proximal face of the plunger when the pin body moves distally through the cylindrical bearing. The outer surface of the bracket inner sleeve can also include, at its proximal end, a cylindrical proximal portion that is approximately the same diameter as the cylindrical surface of the plug. Thus, upon further movement of the pin body through the cylindrical bearing in the distal direction, the plug is prevented from further distal movement, the cylindrical distal portion of the inner surface of the pin inner sleeve slides over the cylindrical proximal portion of the outer surface of the bracket inner sleeve, and a gap opens between the inwardly sloped surface of the plug and the inwardly sloped portion of the inner surface of the pin inner sleeve. The first end seal of the first part may include an inner distal o-ring that slides with the pin inner sleeve over the cylindrical proximal portion of the outer surface of the bracket inner sleeve.

An outer surface of the bracket second sleeve can have, at a proximal end thereof, a cylindrical proximal portion approximately the same diameter as the cylindrical distal portion of the pin central opening surface. With this arrangement, upon yet further movement of the pin body through the cylindrical bearing in the distal direction, a distal facing surface of the pin inner sleeve stops against a proximal facing portion of the outer surface of the bracket inner sleeve, the cylindrical distal portion of the pin central opening surface slides over the cylindrical proximal portion of the outer surface of the bracket second sleeve, and a gap opens between inwardly sloped portions of the pin central opening surface and the outer surface of the pin inner sleeve. The second end seal of the first part includes an outer distal o-ring that slides with the pin body over the cylindrical proximal portion of the outer surface of the bracket second sleeve. The pin inner bias member, the pin outer bias member, and the bracket bias member can be selected such that the first and second end seals of the second part remain sealed, such that the central channel and outer channel of the first part remain closed, and such that the inner channel and the outer channel of the second part remain closed, as the outer distal o-ring slides over the cylindrical proximal portion of the outer surface of the bracket second sleeve. Upon yet more distal movement of the pin body through the cylindrical bearing, a distal end of the pin body contacts a proximal facing portion of an outer surface of the bracket second sleeve, and pushes the bracket second sleeve and the bracket inner sleeve together distally such that the bracket inner sleeve slides distally away from the outwardly sloped surface of the plunger. This opens the first end seal of the second part and connects the inner channel of the second part to the central channel of the first part, until the distal end of the bracket inner sleeve reaches a proximal facing stop surface that prevents further distal movement of the pin inner sleeve while the bracket second sleeve continues to move distally. The continued distal movement of the bracket second sleeve opens the second end seal of the second part and connects the outer channel of the second part to the outer channel of the first part.

In other features, the second part may further include a locking mechanism that inhibits the pin body from moving away from the second part while fluid pressure is applied through the first part and the second part. The first part can include a fluid switch arranged to turn on to weakly couple fluid pressure in the central channel with fluid pressure in the outer channel when the first part is disconnected from the second part, and to turn off to decouple fluid pressure in the central channel with fluid pressure in the outer channel when the first part is connected to the second part. The second part may also include a fluid switch arranged to turn on to weakly couple fluid pressure in the inner channel with fluid pressure in the outer channel when the first part is disconnected from the second part, and to turn off to decouple fluid pressure in the inner channel with fluid pressure in the outer channel when the first part is connected to the second part. The second part can have a distal end cap, which includes the first and second ports of the second part, a first connecting channel communicating between the first port and the inner channel of the second part, and a second connecting channel communicating between the second port and the outer channel of the second part. The second part may also have a backing piece, which includes the inner section member, the outer section member and an opening there-between. The backing piece is capable of moving a small lateral distance from a central axis of the second part.

In another aspect, the invention provides a latch member, such as a latch pin, for a tool coupler, adapted to engage with a latch receptacle, such as a latch bracket, on a tool to lock the tool to the tool coupler. The latch member may include one or a plurality of fluid channels. The plurality of fluid channels can include first and second fluid channels, extending through the latch member for providing a corresponding plurality of fluid connections to the tool through the latch receptacle. The second fluid channel can be an outer fluid channel concentrically surrounding the first fluid channel, and the first fluid channel can be a central fluid channel extending along a central axis of the latch member. A first distal o-ring provides a seal at a distal end of the central channel and a second distal o-ring provides a seal at a distal end of the outer channel when the latch member is disconnected from the latch receptacle. The first and second distal o-rings are located near a distal end of the latch member that connects to the latch receptacle.

An embodiment of the latch pin is adapted to slidingly engage with the latch bracket. The latch pin can further include an elongated pin body that has a central opening extending from a distal end of the latch pin to a proximal end of the latch pin. The central opening has a central opening surface, which includes, at a distal end, a cylindrical distal portion and a tapered portion sloping radially inward toward the cylindrical distal portion, and which also includes, at a proximal end, a cylindrical proximal portion having a smaller diameter than the cylindrical distal portion of the pin central opening surface. The cylindrical distal portion of the central opening surface includes an o-ring groove in which the second distal o-ring is positioned. The cylindrical distal portion and the tapered portion of the pin central opening surface can be part of an outer sleeve substantially fixed in position at a distal end of the pin body. A tube divides between the central channel and the outer channel. The tube includes an outer surface having a proximal portion positioned adjacent the cylindrical proximal portion of the pin central opening surface. A proximal o-ring seals between the proximal portion of the tube outer surface and the cylindrical proximal portion of the pin central opening surface. A first hydraulic fluid port couples to the central channel on a proximal side of the proximal o-ring, and a second hydraulic fluid port couples to the outer fluid channel on a distal side of the proximal o-ring. An inner sleeve includes, at a proximal end of an inner surface, a cylindrical surface that is adapted to slide along a cylindrical surface at a distal end of the tube, which cylindrical surface can be on the outer surface of the tube. The inner sleeve also has an outer surface, which includes a cylindrical distal portion adapted to slide along the cylindrical distal portion of the pin central opening surface. The second distal o-ring provides a seal therebetween. The outer surface of the inner sleeve has a tapered portion adapted to fit against the tapered portion of the pin central opening surface. The inner sleeve has an inner surface that includes a cylindrical distal portion and a tapered portion sloping radially inward toward the cylindrical distal portion of the inner surface of pin inner sleeve. The cylindrical distal portion of the inner sleeve inner surface includes an o-ring groove in which the first distal o-ring is positioned. An outer bias member is arranged to urge the tapered portion of the outer surface of the pin inner sleeve against the tapered portion of the pin central opening surface. A middle o-ring is arranged to provide a seal between the cylindrical surface at the proximal end of the pin inner sleeve and the cylindrical surface at the distal end of the tube. An plug includes a cylindrical distal surface adapted to slide along the cylindrical distal portion of the inner surface of the pin inner sleeve. The first distal o-ring provides a seal therebetween. The plug also has a tapered surface adapted to fit against the tapered portion of the inner surface of the pin inner sleeve. An inner bias member is arranged to urge the tapered portion of the outer surface of the plug against the tapered portion of the inner surface of the pin inner sleeve. In this structure, the central channel is defined by an inner surface of the tube, the inner surface of the pin inner sleeve, the plug, and the first distal o-ring. The outer channel is defined by the pin central opening surface, the outer surface of the tube, the outer surface of the pin inner sleeve, and the second distal o-ring. The proximal o-ring and the middle o-ring seal between the central channel and the outer channel.

The inner bias member can be an inner coil spring positioned between a proximal facing shoulder of an inner surface of the tube and a proximal facing end of the plug. The outer bias member can be an outer coil spring positioned between a proximal facing shoulder formed on the central opening surface and a distal facing shoulder formed on the outer surface of the inner sleeve.

The latch member can further include a fluid switch between the central channel and the outer channel that is closed circuit when the latch member is disconnected from the latch receptacle to equalize pressures between the central channel and the outer channel, and that is open circuit when the latch member is connected to the latch bracket to allow for a pressure difference between the central channel and the outer channel. The fluid switch can include a small aperture in the inner sleeve that is located on a distal side of the middle o-ring when the switch is closed circuit and that is positioned on a proximal side of the middle o-ring when the switch is open circuit.

The latch member can be in combination with the tool coupler. The tool coupler includes a hydraulic latch member actuating mechanism adapted to move the latch member under hydraulic control between a position locked with the latch receptacle and a position unlocked from the latch receptacle. The hydraulic latch member actuating mechanism can include a spring arranged to urge the latch member into the locked position and a hydraulic cylinder having an extendable rod arranged to urge the latch member toward the unlocked position when the rod is extended.

In yet another aspect, the invention provides a latch bracket for attachment to a hydraulically operated tool having a hydraulic mechanism. The latch bracket includes at least a first, and may include a second, fluid channel extending therethrough. The latch bracket is adapted to receive a male latch pin on a tool coupler to lock the tool to the tool coupler and to couple the fluid channels to sources of hydraulic pressure through the latch pin. First and second ports are coupled to the first and second fluid channels, respectively, for coupling the fluid channels to the hydraulic mechanism. The second fluid channel can be an outer fluid channel concentrically surrounding the first fluid channel, and the first fluid channel can be a substantially annular inner fluid channel. An inner proximal o-ring provides a seal at a proximal end of the inner channel and an outer proximal o-ring provides a seal at a proximal end of the outer channel when the latch pin is disconnected from the latch bracket. The first and second proximal o-rings are arranged to unseal when the latch pin connects to the latch bracket.

The latch bracket can include the following additional features. A latch bracket body has a cylindrical bearing at a proximal end adapted to receive and guide the latch pin, and an end cap at a distal end. An elongated plunger extends proximally from the body a first distance. The plunger includes an outwardly sloped surface near a proximal end, and a proximal end face that first contacts a distal end of the latch pin when the latch pin is inserted into the cylindrical bearing. The outwardly sloped surface has an o-ring groove in which the inner proximal o-ring is positioned. A substantially annular inner section member extends proximally from the body a second distance that is less than the first distance. The inner section member includes a cylindrical surface and is arranged substantially concentrically around the plunger, providing a gap therebetween. A substantially annular outer section member extends proximally from the body a third distance that is less than the first distance and greater than the second distance. The outer section member includes a cylindrical surface and is arranged concentrically around the inner section member, providing a gap therebetween. The inner section member and the outer section member can be embodied in a single backing piece, and the gap can be provided by one or more openings in the backing piece. The backing piece is capable of moving a small lateral distance from a central axis of the latch bracket. An inner sleeve includes an inner surface having an outwardly sloped portion at a proximal end adapted to fit against the outwardly sloped surface of the plunger. The first proximal o-ring provides a seal therebetween when the latch bracket is disconnected from the latch pin. The inner sleeve also includes an outer surface having an outwardly sloped portion near a distal end that includes an o-ring groove in which the outer proximal o-ring is positioned, and a cylindrical surface at a distal end that slidingly engages with the cylindrical surface of the inner section member. A inner middle o-ring provides a seal between the cylindrical surface of the inner section member and the cylindrical surface of the bracket inner sleeve. The bracket also includes a second sleeve, which has an inner surface having an outwardly sloped portion at a proximal end adapted to fit against the outwardly sloped surface of the outer surface of the inner sleeve. The outer proximal o-ring provides a seal therebetween when the latch bracket is disconnected from the latch pin. The second sleeve also has a cylindrical surface at a distal end that slidingly engages with the cylindrical surface of the inner section member. An outer middle o-ring is arranged to seal between the cylindrical surface of the outer section member and the cylindrical surface of the second sleeve. A bias member, such as a coil spring, is arranged to urge the second sleeve proximally against the inner sleeve and the inner sleeve against the plunger. With this arrangement, the inner channel is defined by the plunger, an inner surface of the inner section member and the inner surface of the inner sleeve. The outer channel is defined by an outer surface of the inner section member, the outer surface of the inner sleeve, the inner surface of the second sleeve, and an inner surface of the outer section member.

The latch bracket can further include a locking mechanism that inhibits the latch pin from retracting out from the latch bracket while fluid pressure is applied through the latch pin to the latch bracket. The locking mechanism can include a shuttle valve having first and second inlets coupled to the inner and outer channels, respectively, and an outlet. The locking mechanism also includes an outer sleeve arranged adjacent a middle section of the body, which is located between the end cap and the cylindrical bearing. The outer sleeve and the middle section define an annular chamber coupled therebetween. The outer sleeve has an inner cylindrical surface having a diameter approximately the diameter of the cylindrical bearing to receive a distal end of the latch pin. A fluid channel connects between the shuttle valve outlet and a distal end of the chamber. An annular shaped locking block located within the annular chamber is arranged to slide longitudinally therein to a proximal position when fluid pressure is applied to the chamber through the outlet. A plurality of locking members are arranged to extend radially inward from the inner cylindrical surface of the outer sleeve when the locking block moves to the proximal position. This engages the locking members in an annular groove formed on an outer surface of the latch pin.

The latch bracket can further include a fluid switch between the inner channel and the outer channel that is closed circuit when the latch pin is connected to the latch bracket to equalize pressures between the inner channel and the outer channel, and that is open circuit when the latch pin is connected to the latch bracket to allow for pressure differences between the inner channel and the outer channel.

In still another aspect, the invention provides a multi-line, rotatable fluid connector assembly, which includes a first part removably and rotatably connectable to a second part. Each of the first and second parts includes a plurality of fluid channels. Each of the plurality of fluid channels is adapted to connect to a corresponding fluid channel of the other of the first and second parts. Each of the plurality of fluid channels of each of the first and second parts includes an end seal arranged to inhibit fluid from spilling therefrom. The plurality of fluid channels of the first part, the second part, or both the first and second parts are arranged concentrically.

In another aspect, the invention provides a multi-line fluid connector, including first and second parts removably connectable with each other. The first and second parts each includes a plurality of fluid channels.

Each of the plurality of fluid channels is adapted to connect to a corresponding fluid channel of the other of the first and second parts when the first part is connected to the second part. Each fluid channel includes a respective end seal. The first part and the second part are cooperatively structured to provide a make-before-break connection between their respective corresponding fluid channels.

BRIEF DESCRIPTION OF THE DRAWINGS

FIG. 19 shows the latch pin initiating contact with the plunger of the latch bracket. FIG. 20 shows the first coaxial seal exchange. FIG. 21 shows the second coaxial seal exchange. FIG. 22 shows the completed connection.

DETAILED DESCRIPTION OF THE INVENTION

Figure 1:
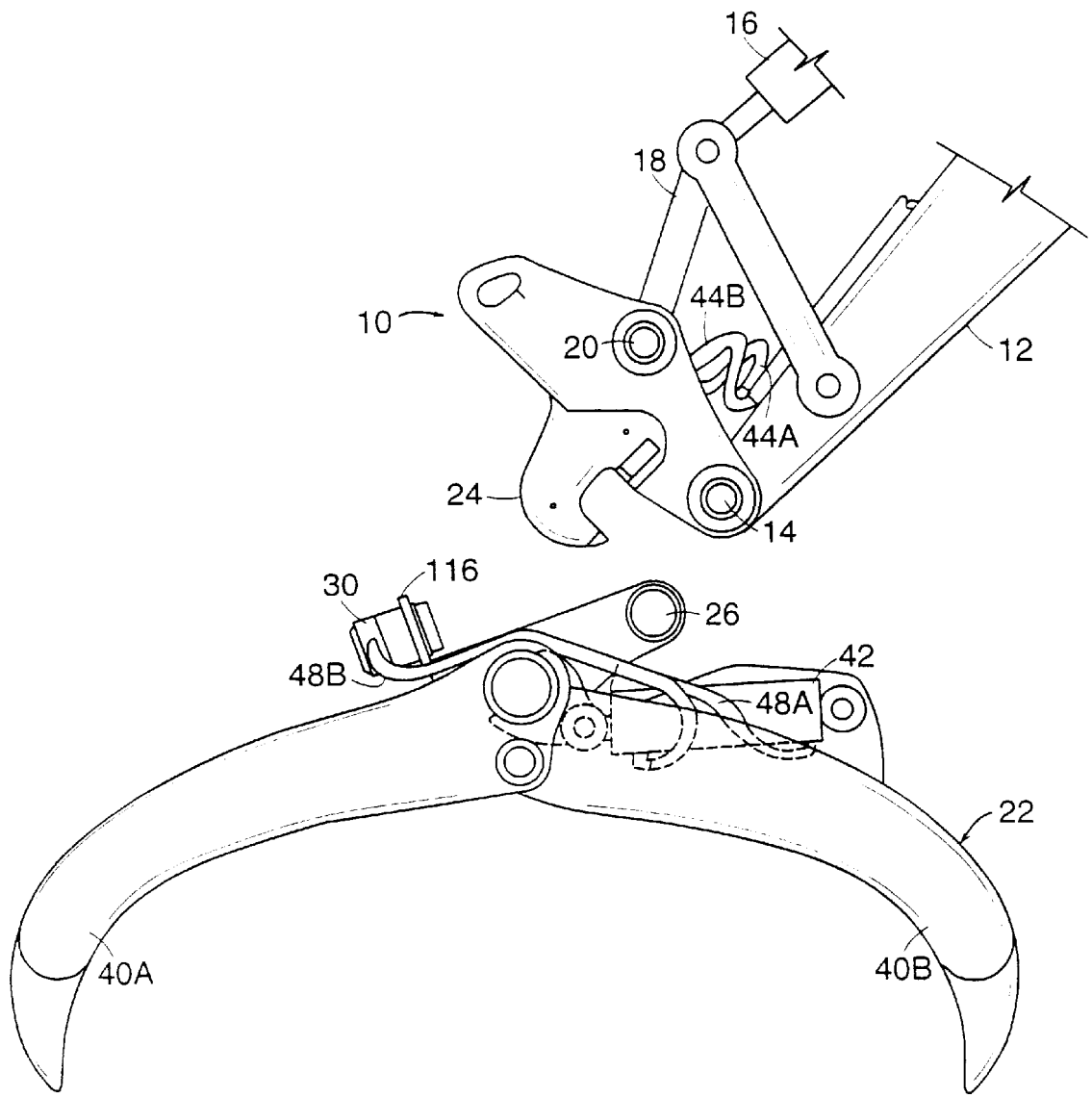
FIG. 1 is a side elevation view of a tool coupler according to the invention on the end of an arm positioned to engage a hydraulic grapple.

Referring to FIG. 1, a quick-connect tool coupler 10 is attached to a dipper stick 12 of a construction equipment, which can be a backhoe, an excavator and the like. Tool coupler 10 can be rotated about a dipper pivot 14 by actuating a bucket cylinder 16, which is coupled by a linkage 18 to a link pivot 20 at a forward end of tool coupler 10. A latch mechanism 21 (FIG. 3) in tool coupler 10 for connecting to a tool is structured substantially the same as the latch mechanisms of quick-disconnect tool couplers described in co-owned U.S. Pat. No. 5,727,342, the entire disclosure of which is included herein by reference. A detailed description of the latch mechanism in this type of tool coupler is provided in that patent, and therefore only a brief description will be provided here.

Figure 2:
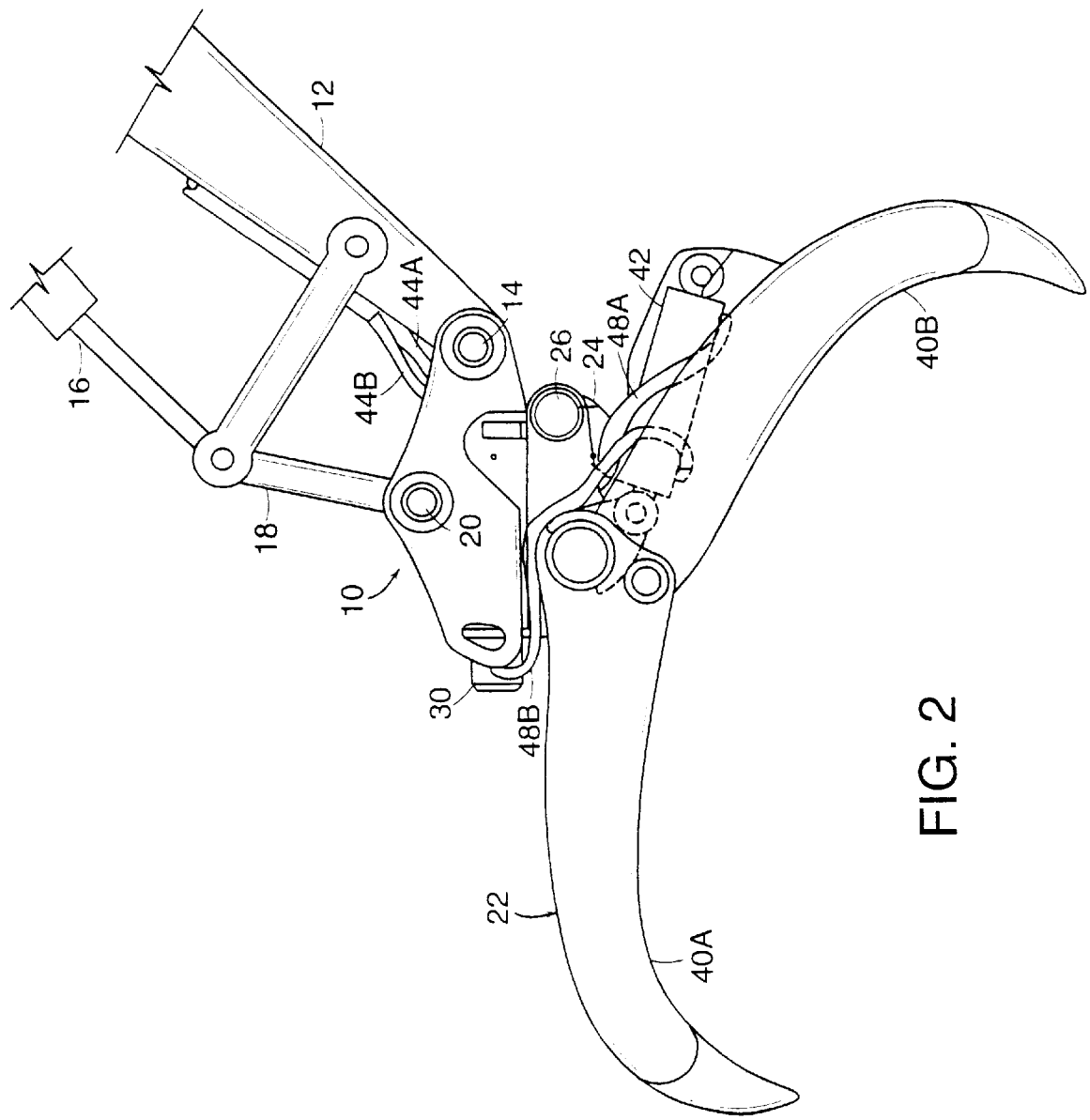
FIG. 2 is a side elevation view of the tool coupler of FIG. 1 attached to the hydraulic grapple.
Figure 3:
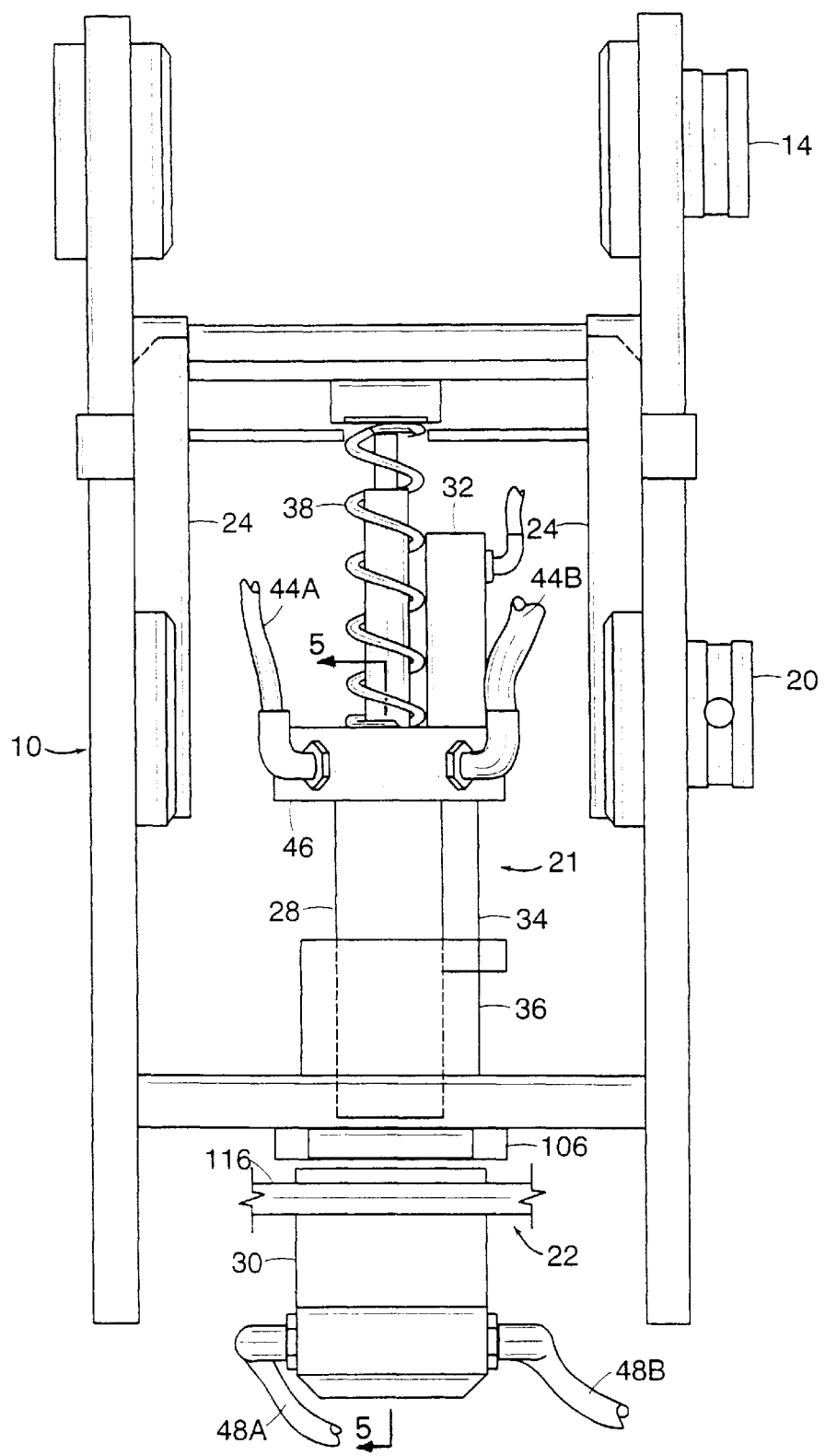
FIG. 3 is a top plan view of the tool coupler of FIG. 1, shown detached from the arm and with its latch pin in a retracted position. A mating portion of the tool that receives the latch pin is partially shown in a broken away view.
Figure 4:
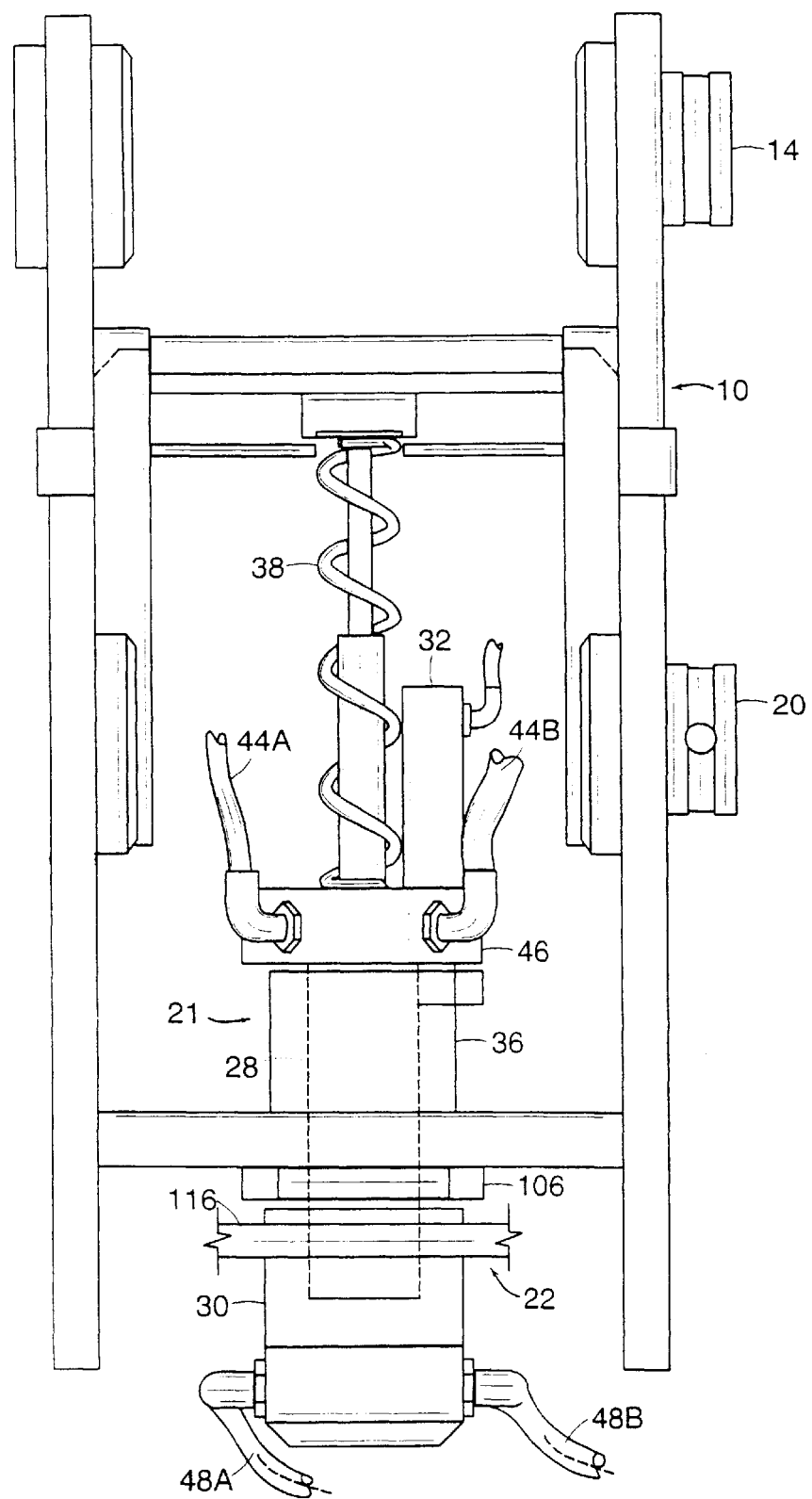
FIG. 4 is a view similar to that of FIG. 3, illustrating the latch pin in the connected position.

In FIG. 1, tool coupler 10 is positioned to engage a hydraulic grapple 22. To engage tool coupler 10 with grapple 22, an operator maneuvers a pair of crescent-shaped hooks 24 (only one shown) depending from tool coupler 10 to engage a cross bar 26 on the upper end of grapple 22. The operator then extends bucket cylinder 16 to rotate tool coupler 10 counter-clockwise as shown in FIG. 2. Referring now also to FIG. 3, this step aligns a latch pin 28 in tool coupler 10 with a latch bracket 30 on grapple 22. Latch pin 28 is held in this retracted position by a latch cylinder 32, which has its rod 34 extended against a latch pin bearing 36. The operator then releases hydraulic pressure in latch cylinder 32, which allows a coil spring 38 to slide latch pin 28 through latch pin bearing 36 and into engagement with latch bracket 30 as illustrated in FIG. 4. These steps are carried out in reverse order to release grapple 22.

Grapple 22 includes a pair of jaws 40A, 40B that are opened and closed by actuating a hydraulic grapple cylinder 42. Latch pin 28 and latch bracket 30 form a two-part, nonspill, hydraulic fluid connector in a two-line fluid circuit bringing controlled hydraulic pressure to grapple cylinder 42. A first pair of hydraulic fluid lines 44A, 44B connect between the hydraulic controls in the equipment and fittings inserted in ports of a latch pin head 46 on a proximal end of latch pin 28. A second pair of hydraulic fluid lines 48A, 48B couple between latch bracket 30 and grapple cylinder 22. The fluid connector includes two separate and substantially coaxial flow paths in each of latch pin 28 and latch bracket 30.

The term "nonspill" as used herein refers to a sealing system wherein, for each flow path, a seal at the end of the flow path of one of the latch pin or latch bracket slides over to provide a seal with a portion of the other of the latch pin or latch bracket before the seal at the end of the corresponding flow path in the other of the latch pin or latch bracket opens to establish the fluid connection. In disconnecting the latch pin from the latch bracket, the seal at the end of the other of the latch pin or latch bracket flow path is reestablished before the sliding seal moves back. In this way, fluid is inhibited from leaking out of the system. This is also called a "make before break" type of connection. As will be described below with reference to the drawings, there is a dual seal within each fluid passageway. Each portion of the connector has seals that close fluid lines when the components are not connected and which resist spilling when making the connection.

The construction of the latch pin 28 will now be described with reference to FIG. 5, which will be followed by a description of the latch bracket 30. Latch pin 28 includes an elongated, tubular latch pin body 50 that is connected, for example, by a continuous weld, at a proximal end to latch pin head 46. The terms "proximal" and "distal" as used with reference to a described item will refer respectively to the right and the left sides of that item as viewed in FIG. 5. Latch pin body 50 has a diameter of about 2.5 inches and a length of about 7.5 inches. Latch pin head 46 includes two boss ports 52A, 52B for coupling to respective hydraulic fluid lines 44A, 44B. Boss ports 52A, 52B are shown angularly displaced from their actual positions for clarity in FIG. 5. Their relative positions are shown more accurately in FIG. 6. Boss ports 52A, 52B receive fittings that connect to respective hydraulic lines 44A, 44B. Each of boss ports 52A, 52B communicates via a respective connecting channel 54A, 54B with a central opening 56 extending through latch pin body 50 and partially through latch pin head 46 from a distal end of latch pin 28. A surface of central opening 56 includes a cylindrical proximal portion 58 within latch pin head 46 that has a smaller radius than a distal portion 60 that extends toward the distal end of central opening 56. A tube 62 inserted into central opening 56 has an outer surface 63 at a proximal end that closely fits adjacent to cylindrical proximal portion 58. An o-ring 64, positioned in an o-ring groove 65 in tube outer surface 63, provides a proximal seal between tube 62 and cylindrical proximal portion 58 of the surface of central opening 56. The seal provided by o-ring 64 separates the interior of latch pin 28 into separate fluid channels 101, 102 as will be described in greater detail below.

Latch pin head 46 also includes a bore hole 66 threaded to receive latch pin cylinder 32. A set screw (not shown) is threaded into a tapped side hole 68 to hold latch pin cylinder 32 in place. A recess 70 on the proximal side of latch pin head 46 receives and retains one end of coil spring 38 (See FIGS. 3 and 4).

Figure 7:
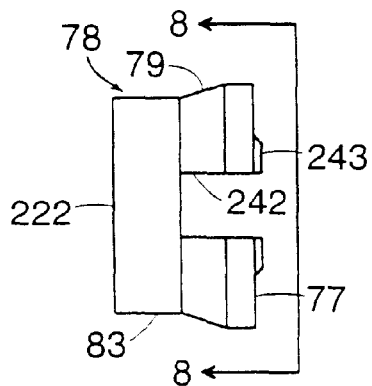
FIG. 7 a side view of the latch pin plug.
Figure 8:
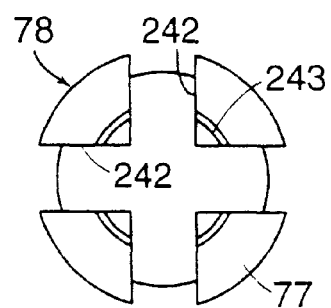
FIG. 8 is an end view of the latch pin plug viewed along line 8—8 of FIG. 7.
Figure 9:
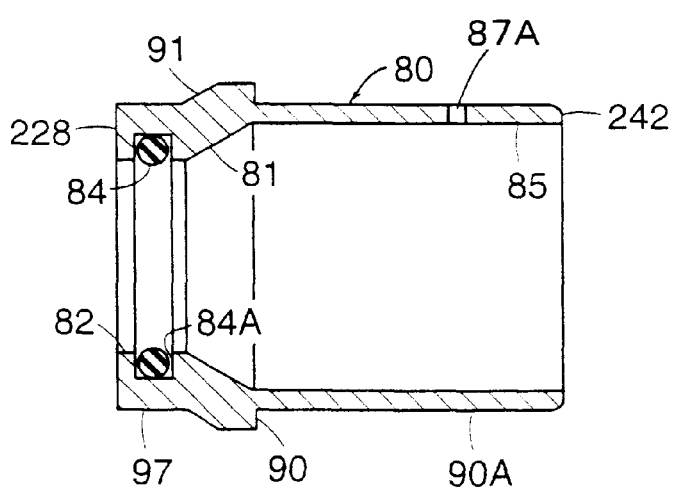
FIG. 9 is a longitudinal sectional view of the latch pin inner sleeve.

Tube 62 extends about 80% of the length of latch pin body 50. One side of a washer 72 rests against a distal facing shoulder 74 formed by an inner surface 75 of tube 62. One end of an inner coil spring 76 presses against the other side of washer 72. Referring now also to FIGS. 7–9, the distal end of coil spring 76 presses against a proximal end surface 77 of a plug 78. Plug 78 has tapered sides 79 and is retained by a distal end of an inner sleeve 80, which has an inwardly tapered portion 81 of an inner surface fitting against tapered sides 79 of plug 78. The inner surface of inner sleeve 80 also has a cylindrical distal portion 82 that slides over a cylindrical distal surface 83 of plug 78. An o-ring 84, positioned in an o-ring groove 84A in cylindrical distal portion 82 of the inner surface of inner sleeve 80, provides a seal between plug 78 and inner sleeve 80 at surfaces 82, 83.

Inner sleeve 80 further includes a cylindrical proximal inner surface 85 adapted to slide over a cylindrical distal outer surface 86 of tube 62. Another o-ring 87 provides a seal between distal outer surface 86 of tube 62 and proximal inner surface 85 of inner sleeve 80. o-ring 87 is positioned in an o-ring groove formed in distal outer surface 86 of tube 62. In the described embodiment, a small aperture 87A that extends radially through inner sleeve 80 is located a short distance from the distal end of tube 62, just distally of o-ring 87.

Figure 10:
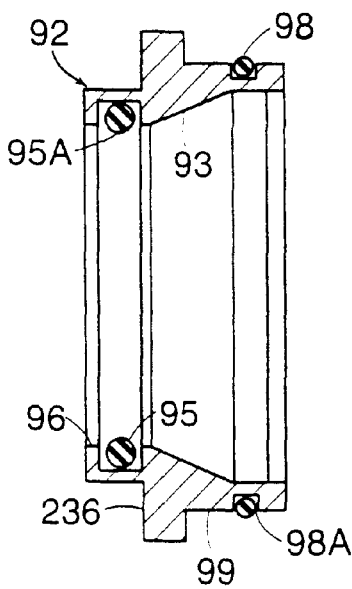
FIG. 10 is a longitudinal sectional view of the latch pin outer sleeve.

An outer coil spring 88 has a proximal end positioned against a distal facing shoulder 89 formed by an inner surface 89A of latch pin body 50. The distal end of coil spring 88 bears against a proximal facing shoulder 90 formed on an outer surface 90A of inner sleeve 80. The distal end of outer surface 90A of inner sleeve 80 has an inwardly tapered portion 91. Referring now also to FIG. 10, an outer sleeve 92 has an inner surface including a central tapered portion 93 that engages tapered portion 91 of the outer surface of inner sleeve 80. Outer sleeve 92 is held in place by a snap ring 94 that fits in an annular groove formed in latch pin body 50. One o-ring 95, which sits in an o-ring groove 95A, provides a seal between a cylindrical distal portion 96 of the inner surface of outer sleeve 92 and a cylindrical distal portion 97 of an outer surface of inner sleeve 80. Another o-ring 98, positioned in o-ring groove 98A, provides a seal between an outer surface 99 of outer sleeve 92 and a cylindrical distal portion 100 of surface 89A of latch pin body 50. The distal surfaces of plug 78, inner sleeve 80, outer sleeve 92 and latch pin body 50 together provide a substantially flat end surface of latch pin 28 when latch pin 28 is in a retracted position within tool coupler 10. By this arrangement, snap ring 94 retains outer sleeve 92, which retains inner sleeve 80 against the spring force exerted against it by outer coil spring 88. Inner sleeve 80 retains plug 78 against the spring force exerted against it by inner coil spring 76.

This arrangement also provides two substantially concentric fluid channels within latch pin 28. A central fluid channel 101 is coupled at a proximal end to boss port 52A through connecting channel 54A. Central channel 101 extends through the space inside tube 62, and through the space inside inner sleeve 80 to plug 78, where o-ring 84 provides an end seal. An outer fluid channel 102 couples to boss port 52B through connecting channel 54B. Outer channel 102 then extends distally through the annular space between outer surface 63 of tube 62 and inner surface 89A of latch pin body 50, and through the annular space between outer surface 90A of inner sleeve 80 and inner surface 89A of latch pin body 50 to outer sleeve 92, where o-rings 95 and 98 provide end seals. O-rings 64 and 87 provide seals between central channel 101 and outer channel 102. Central and outer channels 101, 102 are weakly connected through aperture 87A in inner sleeve 80, which ensures that the pressures will be equalized between inner and outer channels 101, 102 when tool coupler 10 is not connected to a tool.

As described above, latch pin 28 is extended distally by coil spring 38 (FIG. 3) and retracted proximally by extending rod 34 of latch pin cylinder 32. Latch pin bearing 36 restricts latch pin 28 to longitudinal motion. Latch pin bearing 36 includes a latch pin bearing sleeve 104 suitable for use as a slide bearing. Latch pin bearing 36 also includes an arcuate collar 106 on a distal end. Collar 106 is shaped to stop against an upper surface of latch bracket 30 so as to hold tool coupler 10 in a proper lateral position for inserting latch pin 28 into latch bracket 30.

Latch bracket 30 includes three sections that are bolted together: a proximal end section 108 closest to the distal face of latch pin 28; a middle section 110; and a distal end section 112. Latch bracket has an assembled length of about 6.6 inches and a diameter of about 4.5 inches. Proximal end section 108 has a body 114 extending through an aperture in a support plate 116 on grapple 22, and is welded or otherwise secured thereto. A cylindrical latch bracket bearing sleeve 118 positioned within a central bore of body 114 aligns with latch pin bearing sleeve 104 when collar 106 is positioned against body 114 so as to receive latch pin 28 in the extended and locked position.

Figure 11:
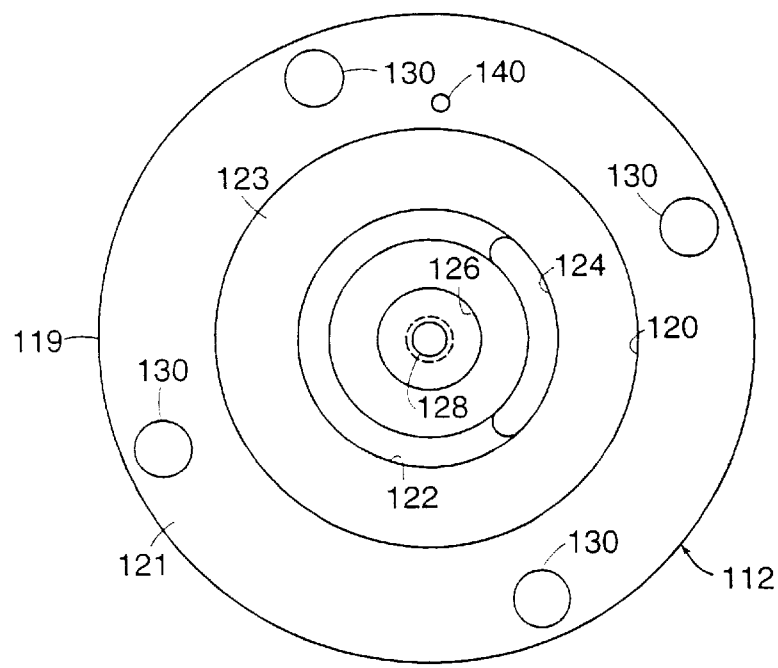
FIG. 11 is a distal end view of latch bracket end section.
Figure 12:
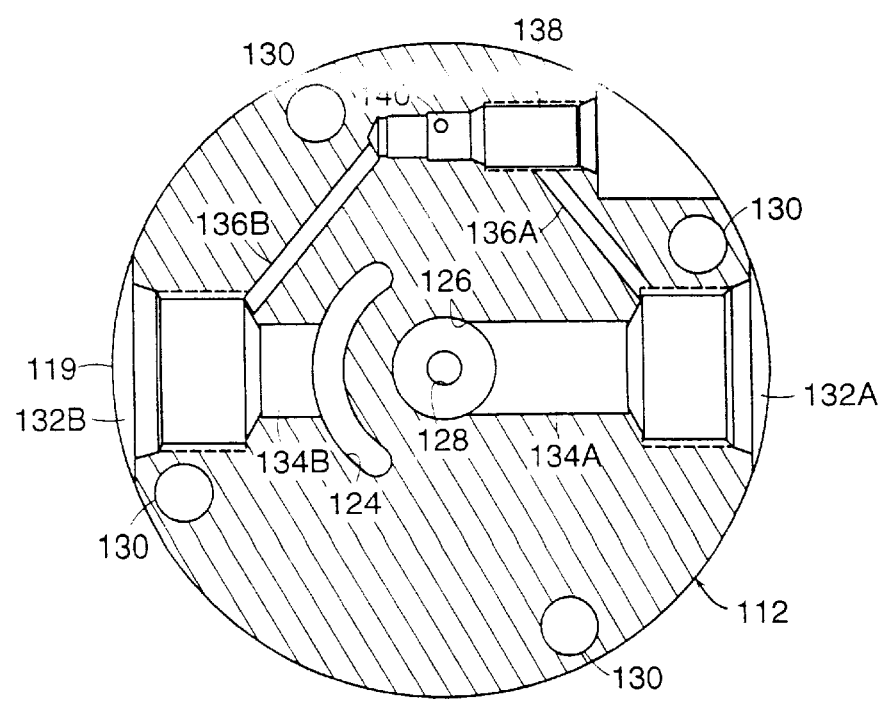
FIG. 12 is a sectional view through line 12—12 of FIG. 5 showing the distal end section of the latch bracket in isolation.

Referring now also to FIGS. 11 and 12, distal end section 112 includes a body, or end cap 119, having an outer bore 120. Outer bore 120 has a diameter of about 2.72 inches and extends to a depth of about 0.314 inch from a proximal end face 121 of end cap 119. An annular groove 122 is formed concentrically within outer bore 120. Annular groove 122 has an inner diameter of about 1.409 inches, a width of about 0.188 inch, and a depth of about 0.188 inch from a bottom surface 123 of outer bore 120. A deeper segment 124 of annular groove 122 is formed to an additional depth of about 0.745 inch. A central inner bore 126 has a diameter of about 0.688 inch and extends to a depth of about 0.927 inch from bottom surface 123 of outer bore 120. The center of inner bore 126 includes a tapped bore 128 that is tapped with a ⁵⁄₁₆–18 thread about 0.62 inch deep. An elongated plunger 129, screwed into tapped bore 128 or otherwise secured at the bottom of inner bore 126, extends through inner bore 126 and out past middle section 110 of latch bracket 30.

Four bolt holes 130 are provided for assembling distal end section 112 with the other two sections of latch bracket 30. Similarly arranged bolt holes (not shown) are provided in a middle section body 131 and proximal end section body 114. The bolt holes in proximal end section body 114 may be threaded or may be clear holes with recessed areas on a proximal side to receive nuts.

Two boss ports 132A, 132B extend diametrically into end cap 119. Boss ports 132A, 132B receive fittings that connect to respective hydraulic lines 48A, 48B. Boss port 132A is in fluid communication with inner bore 126 via one connecting channel 134A, and boss port 132b is in fluid communication with deeper segment 124 of annular groove 122 via another connecting channel 134B. Secondary connecting channels 136A, 136B connect between respective boss ports 132A, 132B and end ports of a shuttle valve 139 (see FIG. 5), positioned within a side chamber 138. Shuttle valve 139 allows fluid flow from the higher pressure of its end ports to a middle port. In the described embodiment, shuttle valve 139 is a model LS04-B30 ball-type, screw-in shuttle valve, available from Hydra Force, Inc. of Lincolnshire, Ill. A third channel 140 extends longitudinally from the middle port of shuttle valve 139 to proximal end face 121 to connect with another longitudinal channel 164 in middle section body 131 as will be described below.

Figure 13:
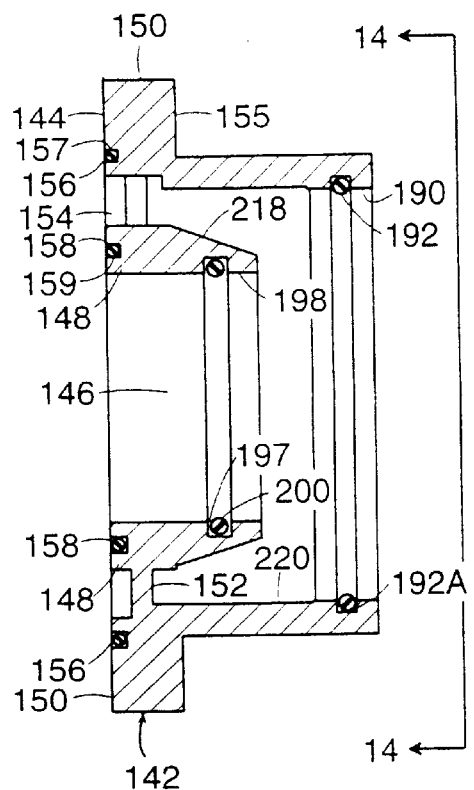
FIG. 13 is a longitudinal sectional view of the latch bracket backing piece.
Figure 14:
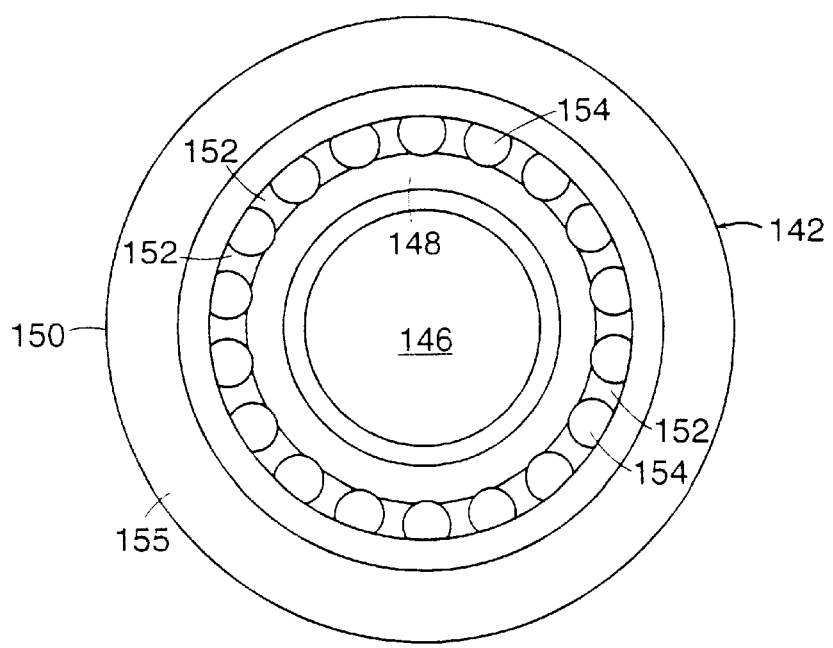
FIG. 14 is an end view of the backing piece along line 14—14 of FIG. 13.

Referring now also to FIGS. 13 and 14, a backing piece 142 is located with its distal end face 144 adjacent bottom surface 123 of outer bore 120 of end cap 119. Backing piece 142 includes a central opening 146, a substantially annular shaped inner section 148 centered on central opening 146, and a substantially annular shaped outer section 150 coaxial with inner section 148. Inner and outer sections 148, 150 are connected by supporting members 152 defining a ring of circular apertures 154 located between inner and outer sections 148, 150. Backing piece 142 is held against end cap 119 by a coil spring 193, which presses against a proximal facing surface 155 of outer section 150. As can be seen in FIG. 5, there is a small radial gap 153, e.g. about ¹⁄₃₂ inch, between outer section 150 of backing piece 142 and a cylindrical surface of end cap 119. This permits backing piece 142 to move a small lateral distance within end cap 119.

Central opening 146 communicates with central bore 126 of distal end section 112, while apertures 154 communicate with annular groove 122 and deeper section 124 of distal end section 112. An outer o-ring 156, which is positioned in an outer o-ring groove 157, provides a seal between end cap 119 and backing piece 142 outside the diameters of outer opening 154 and annular groove 122. An inner o-ring 158, positioned in an inner o-ring groove 159, provides a seal between end cap 119 and backing piece 142 inside the ring of apertures 154 and the diameter of annular groove 122 and outside the diameters of central bore 126 and central opening 146.

Middle section body 131 has a central opening defined by a stepped inner surface 133. A substantially annular-shaped locking ring 160 is positioned in an outer step 162. Longitudinal channel 164 extends from outer step 162 through to a distal end of middle section 110, and is aligned with channel 140 in distal end section 112. An o-ring 165 between middle section body 131 and end cap 119 provides a seal around the connection between channels 140, 164. O-ring 166 provides a seal between locking ring 160 and surface 133.

Figure 15:
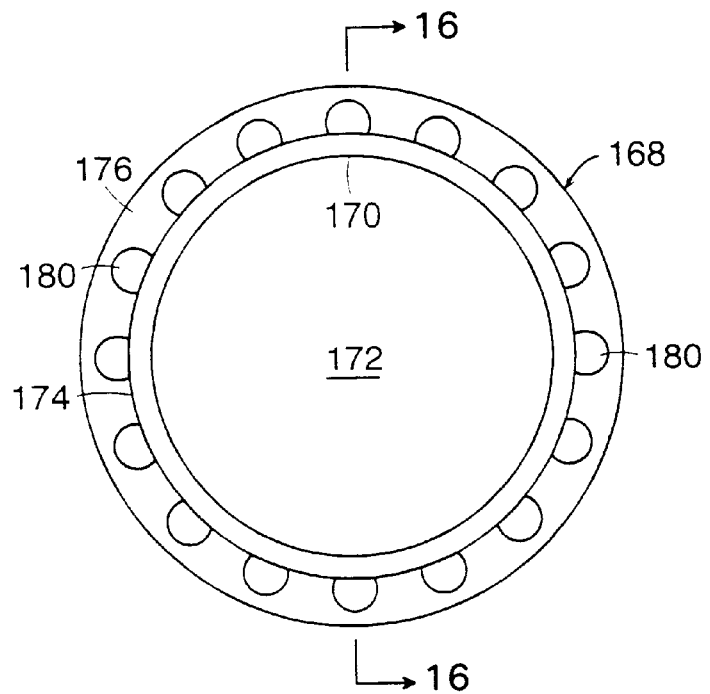
FIG. 15 is a distal end view of the latch bracket outer sleeve.
Figure 16:
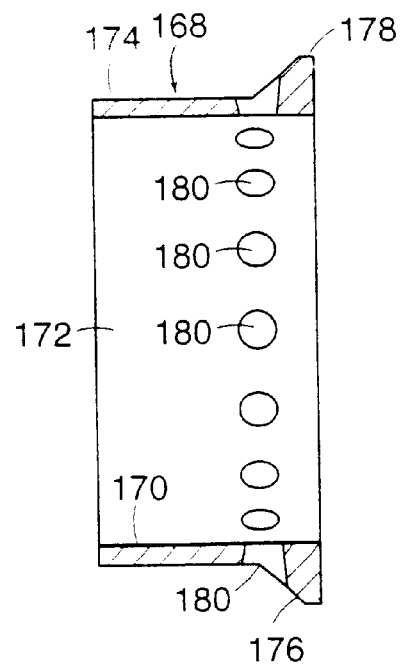
FIG. 16 is a section view through line 16—16 of FIG. 15.

Referring now also to FIGS. 15 and 16, an outer sleeve 168 is positioned in an inner step of surface 133 adjacent to locking ring 160. Outer sleeve 168 includes a cylindrical inner surface 170 providing a central opening 172. An outer surface includes a cylindrical distal portion 174, a central outwardly sloped portion 176, and a proximal cylindrical portion 178. The outer surface of outer sleeve 168 and stepped surface 133 of middle section body 131 define an annular shaped chamber 256 connected at a distal end to longitudinal channel 164. Locking ring 160 slides laterally when fluid pressure is applied to chamber 256 through longitudinal channel 164. O-ring 177 provides a seal between distal cylindrical surface 174 and surface 133 of middle section body 131. Another o-ring 179 provides a seal between distal cylindrical surface 174 and an inner cylindrical surface of locking ring 160. O-rings 166, 177, 179 seal chamber 256.

Spaced evenly around outer sleeve 168 at a juncture between cylindrical distal surface 174 and outwardly sloped surface 176 are sixteen radially extending, tapered apertures 180, which are larger on an outer surface than on inner surface 172. Inside each aperture 180 is a ball bearing 182. Locking ring 160 responds to fluid pressure in channel 164 by sliding in a proximal direction between step surface 162 and outer sleeve 168. This causes an outwardly sloped proximal surface 183 of locking ring 160 to push ball bearings 182 radially inward.

Figure 5:
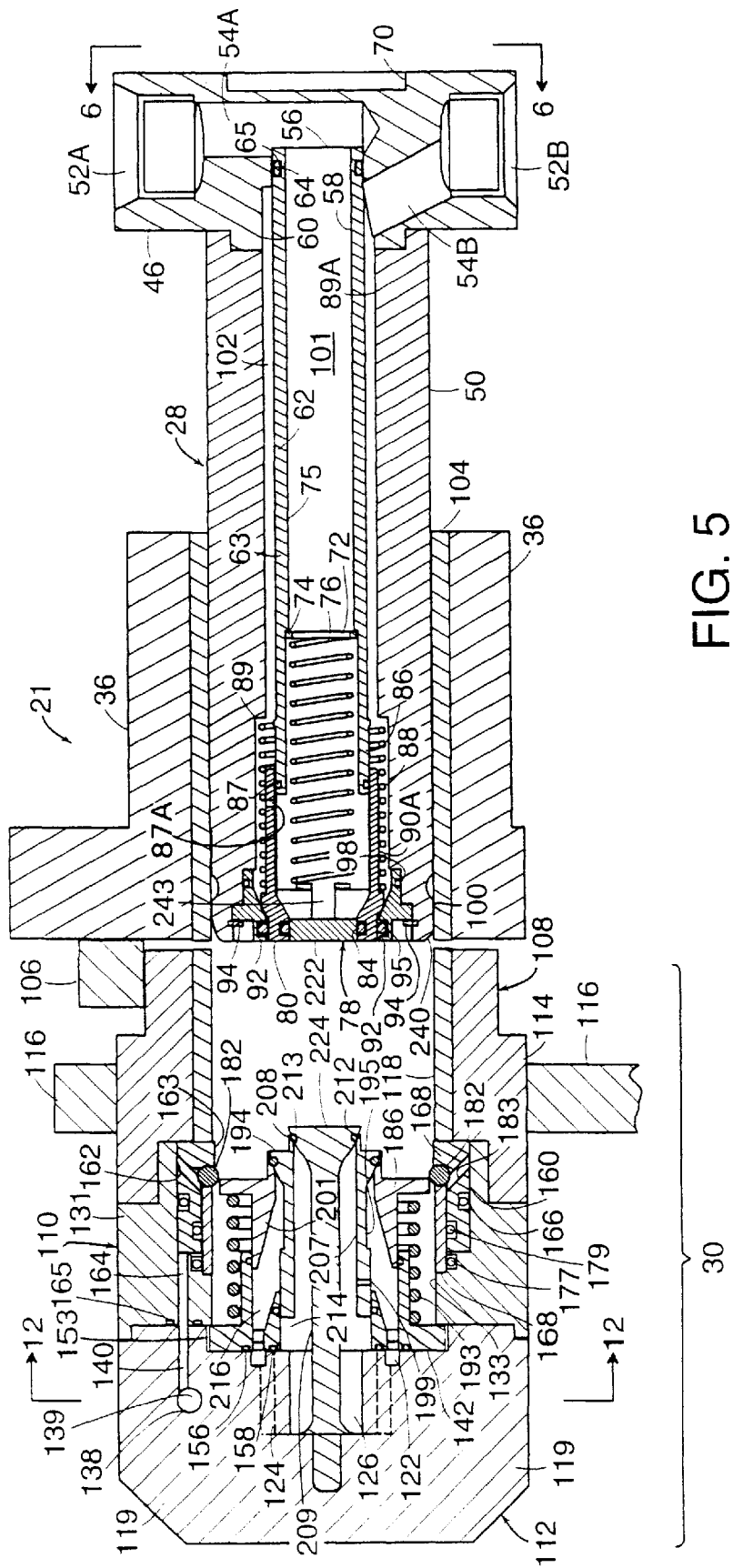
FIG. 5 is a longitudinal section view along line 5—5 of FIG. 3, illustrating a multi-line hydraulic coupling according to the invention. A latch pin and a latch bracket are shown in an unlatched position.
Figure 6:
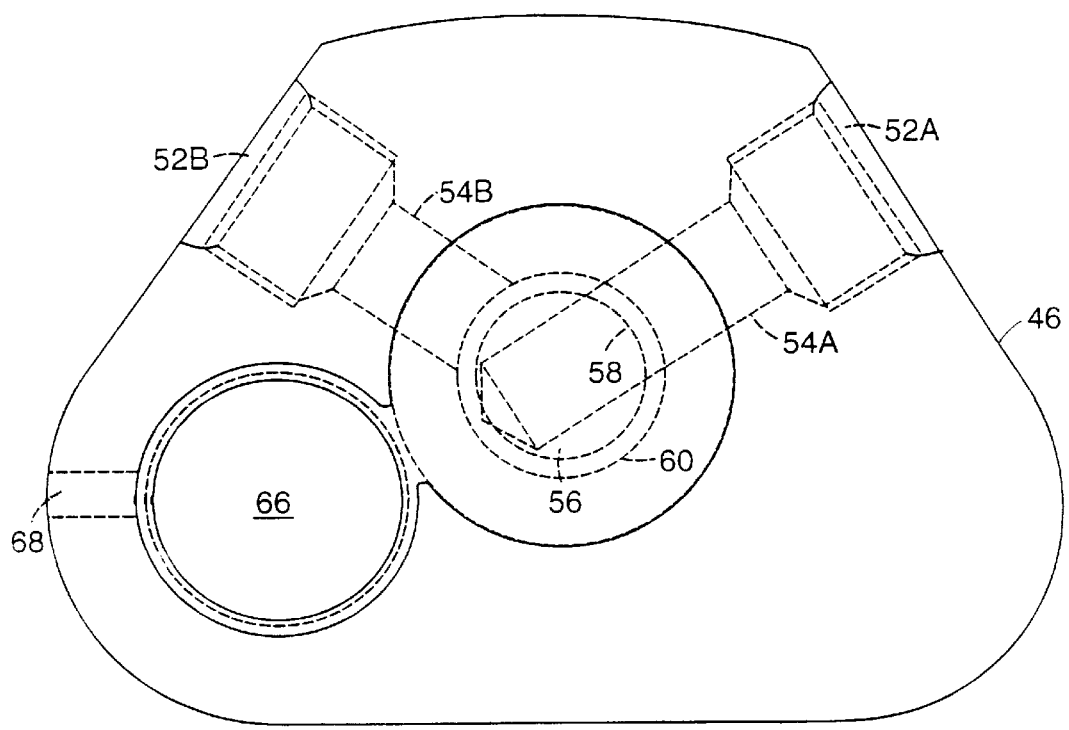
FIG. 6 is an end view of the latch pin end cap viewed from line 6—6 of FIG. 5. Internal features are shown in shadow.
Figure 17:
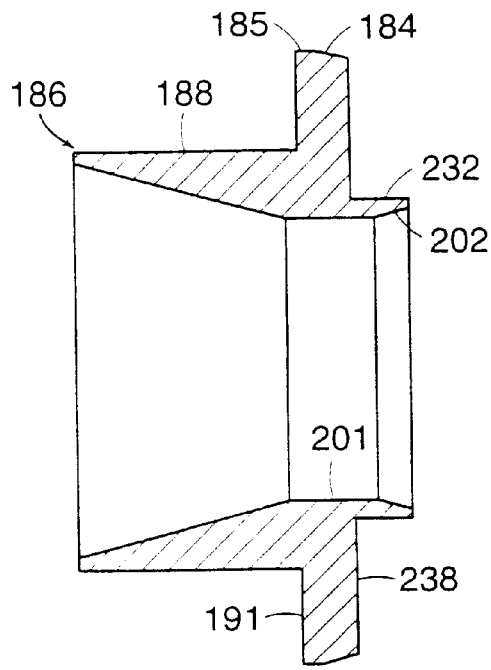
FIG. 17 is a longitudinal section view of the latch bracket middle sleeve.

In the unlatched position shown in FIG. 5, ball bearings 182 contact an inwardly tapered outer rim 184 of a flange 185 on a middle sleeve 186. Referring now also to FIG. 17, which shows middle sleeve 186 in isolation, an outer surface of middle sleeve 186 includes a cylindrical distal portion 188 in sliding contact with a cylindrical inner surface 190 of a proximal end of outer section 150 of backing piece 142. An o-ring 192 positioned in an o-ring groove 192A provides a seal between surfaces, 188 and 190, of middle sleeve 186 and backing piece 142, respectively. Middle sleeve 186 is urged in a proximal direction by coil spring 193, positioned between proximal facing surface 155 of backing piece 142 and a distally facing surface 191 (FIG. 12) of flange 185 of middle sleeve is 186.

Figure 18:
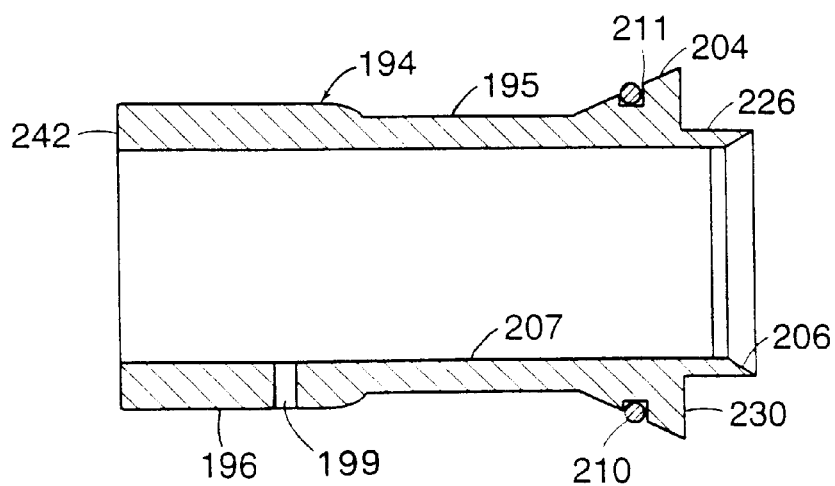
FIG. 18 is a longitudinal section view of the latch bracket inner sleeve.

Middle sleeve 186 in turn, is retained in position by an inner sleeve 194, which is, in turn, held in position by plunger 129. Referring now also to FIG. 18, which shows inner sleeve 194 in isolation, an outer surface 195 of inner sleeve 194 includes an cylindrical distal portion 196 in sliding contact with a cylindrical inner surface 198 of inner section 148 of backing piece 142. An o-ring 200 that sits in an o-ring groove 197 in inner section 148 provides a seal between cylindrical surface portions 198 and 196. In the described embodiment, a small aperture 199 that extends radially through inner sleeve 194 is located just proximally of inner section 148 of backing piece 142. An inner surface 201 of middle sleeve 186 has an outwardly sloped proximal portion 202 urged by spring 193 into contact with a similarly sloped proximal portion 204 of an outer surface 195 of inner sleeve 194 when latch bracket 30 is in the unlatched position shown in FIG. 5. This also urges an outwardly sloped portion 206 at the proximal end of an inner surface 207 of inner sleeve 194 into contact with plunger 129 at a similarly sloped portion 208 of an enlarged proximal end of a surface 209 thereof. Sloped portion 208 of plunger surface 209 thus retains inner sleeve 194 and middle sleeve 186 in place against the bias force of spring 193, which urges these pieces proximally out of latch bracket 30. One o-ring 210 that sits in an o-ring groove 211 in inner sleeve 194 provides a seal between sloped surface portions 202, 204 of middle and inner sleeves 186, 194, respectively. Another o-ring 212 provides a seal between surfaces 206, 208 of inner sleeve 194 and plunger, respectively, and is located in an o-ring groove 213.

As is now apparent from the above description, latch bracket 30, like latch pin 28, includes two substantially concentric fluid channels. An annular inner fluid channel 214 is substantially defined by longitudinal surface 209 of plunger 129, o-ring 212, inner surface 207 of inner sleeve 194, o-ring 200, inner surface 198 of inner section 148 of backing piece 142, o-ring 158, and central bore 126 of distal end section 112. Inner fluid channel 214 connects to hydraulic fluid line 48A, as described above, through connecting channel 134A and boss port 132A. A substantially annular outer fluid channel 216 is substantially defined by o-rings 156, 158, an outer surface 218 of inner section 148 of backing piece 142, outer surface 195 of inner sleeve 194, o-ring 210, inner surface 201 of middle sleeve 186, o-ring 190, an inner surface 220 of outer section 150 of backing piece 142, and annular groove 122 of distal end section 112. Outer channel 216 connects to hydraulic fluid line 48B 30 through connecting channel 134B and boss port 132B. In the unlatched configuration illustrated in FIG. 5, inner and outer channels 214, 216 of latch bracket 30 are weakly connected through aperture 199 in latch bracket inner sleeve 194. This feature equalizes the pressure between inner and outer channels 214, 216 when latch bracket 30 is unconnected from latch pin 28.

To assemble latch pin 28, latch pin body 50 is first fastened to latch pin head 46. Tube 62, with o-rings 64, 87 each positioned in respective o-ring grooves 65, 87A, is fully inserted within pin body 50 so that it abuts the proximal end of central opening 56. With latch pin head 46 resting on its proximal end, washer 72 is dropped into tube 62 so that washer 72 rests upon shoulder 74. Inner coil spring 75 is dropped into tube 62, such that it is supported by washer 72. Outer coil spring 88 is then dropped into latch pin body 50 central opening 56 over tube 62 so that outer coil spring 88 rests on shoulder 89 of inner surface 89A of latch pin body 46. Plug 78, inner sleeve 80 and outer sleeve 92 are assembled separately, with o-rings 84, 95, 98 positioned in respective o-ring grooves 84A, 95A, 98A. The sub-assembly of plug 78, inner sleeve 80 and outer sleeve 92 is then positioned within central opening 56 of latch pin body 50. In this manner, proximal end surface 77 of plug 78 contacts inner coil spring 76, inner surface 85 of inner sleeve 80 is positioned to slide over cylindrical distal outer surface 86 of tube 62, shoulder 90 of inner sleeve contacts outer coil spring 88, and outer sleeve 92 is positioned concentric to inner sleeve 80. After pushing the sub-assembly of plug 78, inner sleeve 80, and outer sleeve 92 into position, snap ring 94 is inserted to retain the sub-assembly in place against the forces exerted by springs 76, 88.

Latch bracket 30 is assembled in the following manner. Distal end cap 112 is turned so that center bore 126 is exposed. O-rings 156, 158, 192, and 200 are positioned within respective o-ring grooves 157, 159, 192A, 197 of backing piece 142, which is then positioned within the opening of end cap 112. Coil spring 193 is then positioned on surface 155 of backing piece 142 and middle sleeve 186 is positioned on spring 193 and inside outer section 150 of backing piece 142. Inner sleeve 194 is then placed inside middle sleeve 186 and inner section 148 of backing piece 142. Plunger 129 is then inserted inside inner sleeve 194.

Spring 193 is compressed by screwing the distal end of plunger 129 into threaded bore 128 of end cap 112. Sloped portion 208 of plunger surface 209 contacts sloped portion 206 of inner surface 207 of inner sleeve 194 when plunger 129 is positioned properly.

Latch bracket middle section 110 is assembled by the following steps. First, o-ring 177 is positioned in the appropriate o-ring groove of middle section body 131 and o-rings 166, 179 are positioned in their respective o-ring grooves of locking ring 160. Locking ring 160 is then slipped over outer sleeve 168, leaving a gap between surface 183 of locking ring 160 and surface 176 of outer sleeve 168. With outer sleeve 168 standing on its distal end, ball bearings 182 are then dropped into the gap until each is positioned in one of tapered apertures 180. Locking ring 160 is next moved up proximally against ball bearings 180 to hold them in place. The assembly consisting of locking ring 160, outer sleeve 168 and ball bearings 180 is then inserted into middle section body 131 until the distal end of outer sleeve 168 butts up against a step formed in inner surface 133 of middle section body 131.

To complete assembly of latch bracket 30, bolts (not shown) are inserted through bolt holes 130 in end cap 119 and distal end section 112 is positioned upright on its distal end. Middle section body 131 is placed on end cap 119 with channels 140, 164 aligned, such that the bolts extend through appropriately placed bolt holes (not shown) in middle section body 114. Proximal end section 108 is then placed on top of middle section 110 such that the bolts fit into respective bolt holes (not shown) in proximal end section 108, and the assembly is secured by tightening the bolts.

In the unlatched position shown in FIG. 5 each of central and outer fluid channels 101, 102 of latch pin 28 are sealed at a distal end of latch pin 28, even when positive fluid pressure is applied in these channels 101, 102. Also, each of inner and outer fluid channels 214, 216 of latch bracket 30 are sealed at a proximal end, and remain closed even when some residual fluid pressure remains in latch bracket 30. As will be described below, when latch pin 28 and latch bracket 30 are fully connected together, central fluid channel 101 of latch pin 28 and inner fluid channel 214 of latch bracket 30 are coupled together in fluid communication, and outer fluid channel 102 of latch pin and outer fluid channel 216 of latch bracket 30 are coupled in fluid communication with each other. The connection is made in a non-spill manner, such that hydraulic fluid does not leak from either latch pin 28 or latch bracket 30 at any time during the connection process. Seals are maintained to inhibit fluid leaking out from any of the channels or from cross-leaking between channels when latch pin 28 and latch bracket 30 are in a coupled position.

The operation of the latching mechanism will now be described with reference to FIGS. 5 and 19–22. Normally, hydraulic pressure will be released from fluid channels 101, 102 prior to coupling. Some residual fluid and pressure may remain in either or both fluid channels 101, 102. This pressure would be equalized by a small flow through aperture 87A in the described embodiment. Similarly, any residual pressure that may be left in channels 214, 216 in latch bracket 30 would be equalized by flow through aperture 199.

Figure 22:
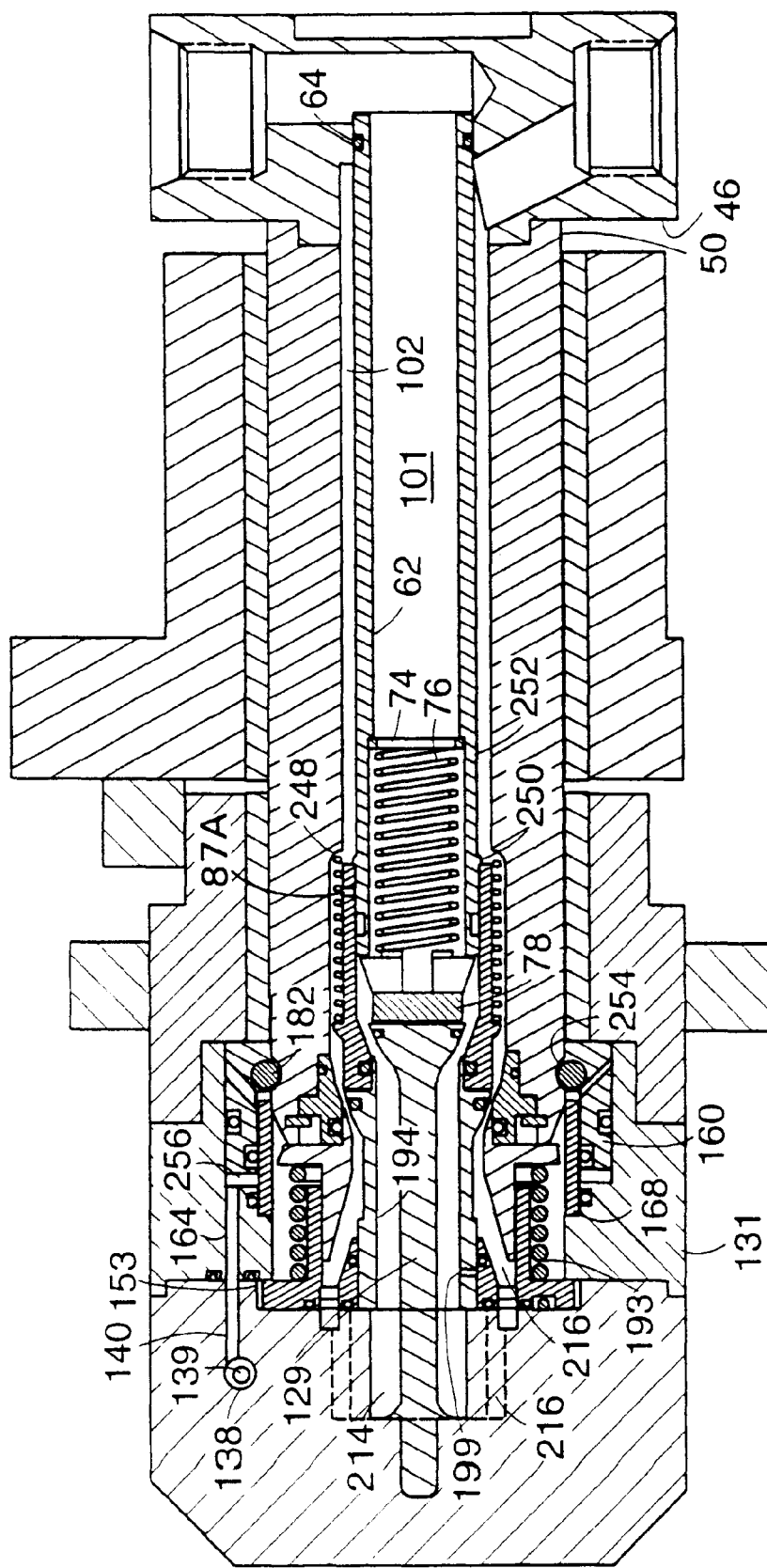

When hydraulic pressure in latch pin cylinder 32 is released, spring 38 moves latch pin 28 very quickly through bearing sleeves 104, 118, from an unconnected position shown in FIG. 5 to a locked position shown in FIG. 22. Referring first to FIG. 19 and also referring again to FIG. 5, after latch pin 28 has traveled through most of proximal end section 108 of latch bracket 30, a distal end face 222 of plug 78 makes first contact with a proximal end face 224 of plunger 129. As latch pin 28 continues to move distally into latch bracket 30, plug 78 is stopped from further movement by plunger 129, which is rigidly attached to end cap 119. However, the remainder of latch pin 28 continues to move distally into middle section 110.

Figure 20:
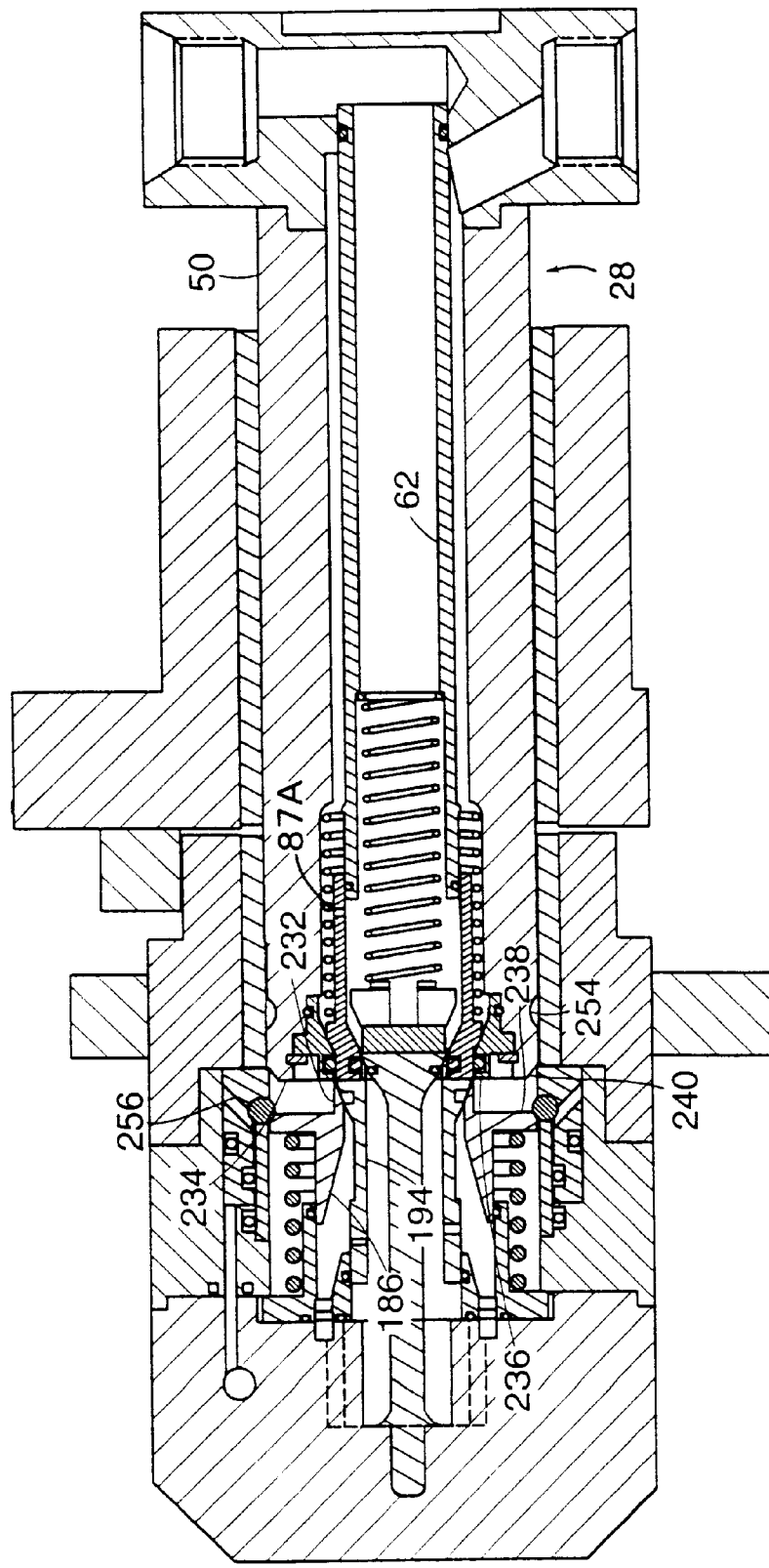

As seen best in FIG. 20, cylindrical distal portion 82 of the inner surface of inner sleeve 80 of latch pin 28 has a diameter just large enough to slide over a cylindrical outer surface 226 of a proximal end of inner sleeve 194 of latch bracket 30. As inner sleeve 80 of latch in 28 slips over inner sleeve 194 of latch bracket 30, plug 78 is pushed proximally deeper into latch pin 28 by plunger 129 working against the bias force of inner coil spring 76. This also causes o-ring 84 to slide off cylindrical distal outer surface 83 of plug 78 and onto cylindrical outer surface 226 of inner sleeve 194 in a continuous manner such that the seal at the end of central channel 101 does not leak.

Figure 21:
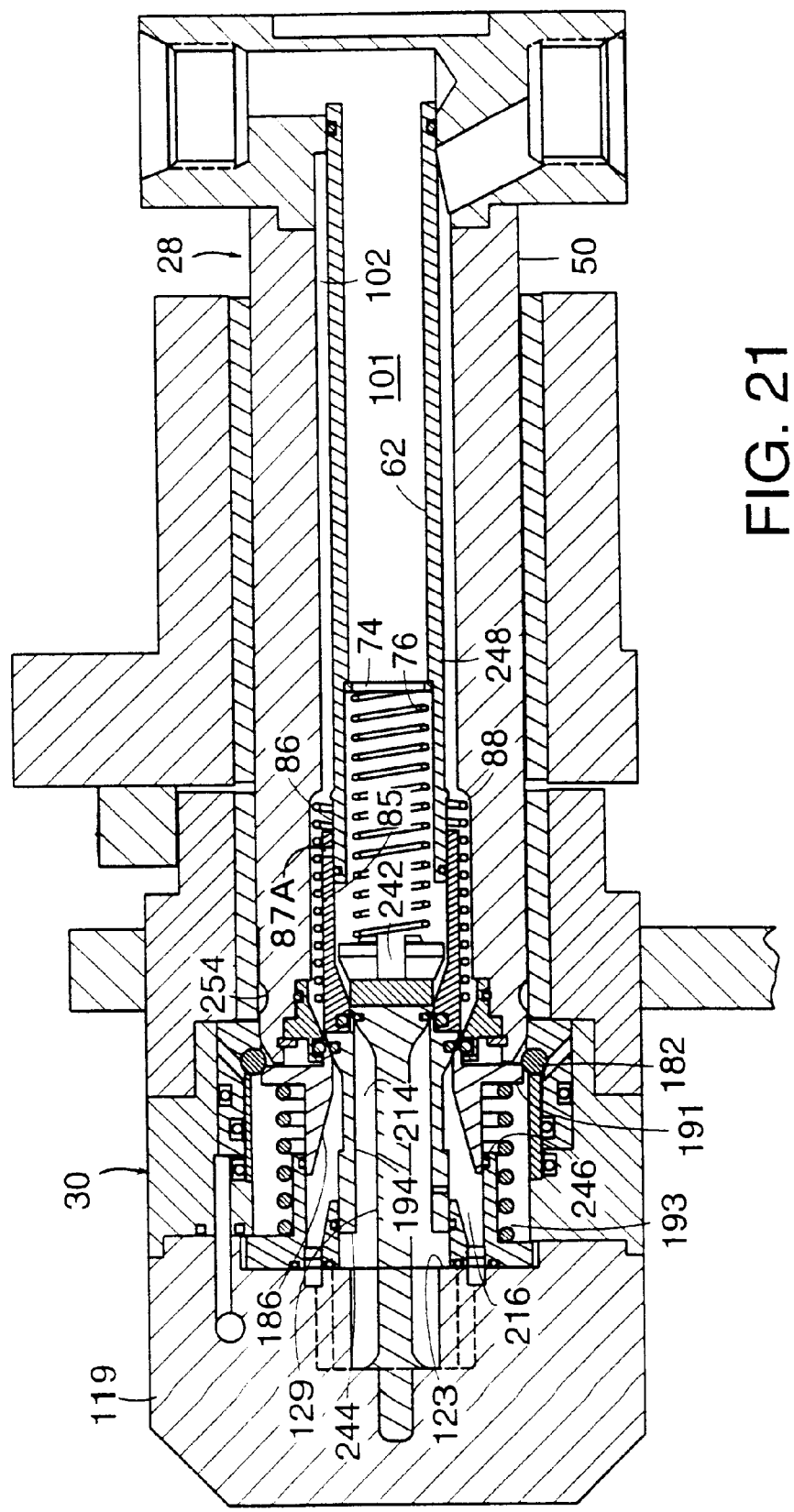

When a distal end face 228 of latch pin inner sleeve 80 reaches a proximal facing surface 230 of latch bracket inner sleeve 194, inner sleeve 80 is stopped from further movement. Referring now also to FIG. 21, latch pin 28 has moved beyond inner section 108 of latch bracket 30 and into middle section 110. Cylindrical distal portion 96 of the inner surface of latch pin outer sleeve 92 has a diameter slightly larger than a cylindrical proximal outer surface 232 of latch bracket middle sleeve 186. This allows latch pin outer sleeve 90 to slide over middle sleeve 186 while o-ring 95 continuously maintains a seal at the end of outer channel 102. Meanwhile, tube 62 slides inside latch pin inner sleeve 80, as o-ring 87 maintains the seal between their respective outer and inner surfaces 86, 85. Note that aperture 87A is now located proximally of o-ring 87, so that central channel 101 is sealed off from outer channel 102.

As latch pin 28 continues to move distally into latch bracket 30, a distal end face 234 of latch pin body 50 and a distal end face 236 of outer sleeve 92 both make contact with a proximal facing surface 238 of middle sleeve 186 of latch bracket 16. A beveled distal corner 240 of latch pin body 50 also makes contact with balls 182. Central and outer channels 101, 102 in latch pin 28 remain closed through this point, as do inner and outer channels 214, 216 in latch bracket 30. Coil springs 76, 88 in latch pin 28 have both been compressed, but coil spring 193, which is a much heavier spring than coil springs 76, 88, has not been compressed to any significant degree.

Latch pin 28 continues to slide distally into latch bracket 30 under the force of coil spring 38, moving between the position shown in FIG. 21 and the position shown in FIG. 22, which is a terminal position. Latch pin body 50 and latch pin outer sleeve 92 push latch bracket middle sleeve 186 distally against the countering bias force of spring 193. As middle sleeve 186 is pushed back, outer spring 88 in latch pin 28 forces latch pin inner sleeve 80 to push latch bracket inner sleeve 194 back along with middle sleeve 186. This moves latch bracket inner sleeve 194 back and away from plunger 129, closing the fluid circuit between central channel 101 in latch pin 28 and inner channel 214 in latch bracket 30. Plug 78 includes flutes 242 cut into a proximal end to better enable fluid flow around plug 78 from central channel 101 to inner channel 214 (see, also, FIGS. 7 and 8). In addition, plug 78 includes a circular ridge 243 on a proximal side that helps to keep inner coil spring 76 centered on plug 78 and plug 78 centered on plunger 129. At this point, outer fluid channel 102 in latch pin 28 is still sealed, as is outer fluid channel 216 in latch bracket 30.

Latch bracket inner sleeve 194 slides distally within inner section 148 of backing piece 142 until a distal end 244 of inner sleeve 194 reaches bottom surface 133 of outer bore 120 of end cap 119. At some time in this travel, aperture 199 moves to the distal side of o-ring 200, which closes off the small passageway provided by aperture 199 between inner and outer channels 214, 216 in latch bracket 30.

This also prevents further movement of latch pin inner sleeve 80, but tube 62 continues to slide distally within inner sleeve 80 as latch pin 28 continues moving. Latch pin 28 also continues to push middle sleeve 186 distally until distally facing surface 191 of flange 185 moves close to a proximal end 246 of backing piece 142. At this point, as shown in FIG. 22, a proximal end 248 of latch pin inner sleeve 80 is close to a shoulder 250 formed on an outer surface 252 of tube 62. In addition, latch pin body 50 has slid deep enough into latch pin bracket 30 such that balls 182 can move into an annular groove 254 formed on an outer surface of latch pin body 50.

The continued movement of middle sleeve 186, while at the same time inner sleeve 194 is stopped, opens the seal provided by o-ring 210 between inner sleeve 194 and middle sleeve 186. This closes the fluid circuit between outer fluid channel 102 in latch pin 28 and outer fluid channel 216 in latch bracket 30. Now both fluid circuits are connected, with central channel 101 in fluid communication with inner channel 214 and outer channel in fluid communication with outer channel 216, and grapple 22 is secured to tool coupler 10.

Latch mechanism 21 includes a hydraulic locking mechanism that inhibits release of latch pin 28 when fluid pressure is applied to the attached tool through the fluid connector. Locking ring 160 is free to slide longitudinally in annular chamber 256 provided between latch bracket outer sleeve 168 and middle section body 131. Shuttle valve 139 reacts to fluid pressure in either of channels 214, 216 by permitting fluid from the higher pressure side to flow into channel 140. Channel 140 is in fluid communication with longitudinal channel 164, which is in fluid communication with annular chamber 256. O-rings 166, 177, 179 provide seals inhibiting the fluid from leaking out of annular chamber 256. Fluid pressure in annular chamber 256 causes locking ring 160 to slide proximally to the end of annular chamber 256. This causes a sloped proximal surface 258 of locking ring 160 to push balls 182 radially inward into annular groove 254 of latch pin body 50 and holds them there under the applied hydraulic pressure. Thus, so long as hydraulic pressure is applied through at least one of the fluid channels in the connector, latch pin 28 is inhibited from being accidentally disconnected from latch bracket 28, which could release grapple 22 or other tool from tool coupler 10. Moreover, fluid pressure is maintained in grapple 22, preventing accidental release of material being held by grapple 22. For both these reasons, the locking feature provides an added measure of safety for ground personnel working near the equipment to which the tool is attached.

The described connector is designed so that it does not require perfect alignment between latch pin 28 and latch bracket 30. Latch pin 28 is substantially well aligned with latch bracket 30 before their internal parts begin to couple because of the close fit between latch pin body 50 and latch bracket bearing sleeve 118. Most lateral movement of latch pin 28 is inhibited because of this fit. In addition, backing piece 142 has some room to move laterally within gap 153. This permits the sliding parts, such as sleeves 80, 186, and 194, to align properly during the connecting process. When a tool, such as grapple 22, is in use, there will be some small lateral jostling of latch pin 28 within latch bracket 30. Gap 153 provides some room for back piece 142 to also move, which helps maintain integrity of the seals within the connector.

To disconnect a tool, such as grapple 22, from tool coupler 10, the operator first reduces hydraulic pressure in lines 44A, 44B, which reduces hydraulic pressure in the attached tool. This also releases pressure in the hydraulic locking mechanism described above, permitting latch pin 28 to be retracted from latch bracket 30. With the tool resting on the ground and bucket cylinder extended 16, the operator applies hydraulic pressure to latch cylinder 32. This extends rod 34 against latch pin bearing 36, which is fixed to the frame of tool coupler 10. Extending rod 34 moves latch pin head 46 (and the rest of latch pin 28) proximally and counter to the bias force exerted by coil spring 38. As latch pin 28 is pulled back, spring 88 keeps latch bracket inner sleeve 194 in place against end cap 119, while latch bracket middle sleeve 186 follows latch pin 28 under the force exerted by coil spring 193. Sloped proximal portion 202 of inner surface 201 of middle sleeve 186 contacts sloped proximal portion 204 of outer surface 195 of inner sleeve 194, and starts to push inner sleeve with middle sleeve 186. O-ring 210 reseals outer channel 216 with contact between middle sleeve 186 and inner sleeve 194. Eventually, inner sleeve 194 is carried proximally to make contact with plunger 129 again, and o-ring 212 reseals inner channel 214. With latch pin 28 retracting further, latch pin outer sleeve 92 slides back over latch pin inner sleeve 80, reestablishing an end seal for outer fluid channel 102 with o-ring 95. Next, tapered portion 93 of the inner surface of outer sleeve 92 contacts tapered portion 91 of the outer surface of inner sleeve 80, and outer sleeve 92 starts pulling inner sleeve 80 proximally with latch pin body 50. Inner sleeve 80 slides back over plug 78, and o-ring 84 reseals the distal end of central fluid channel 101.

Figure 19:
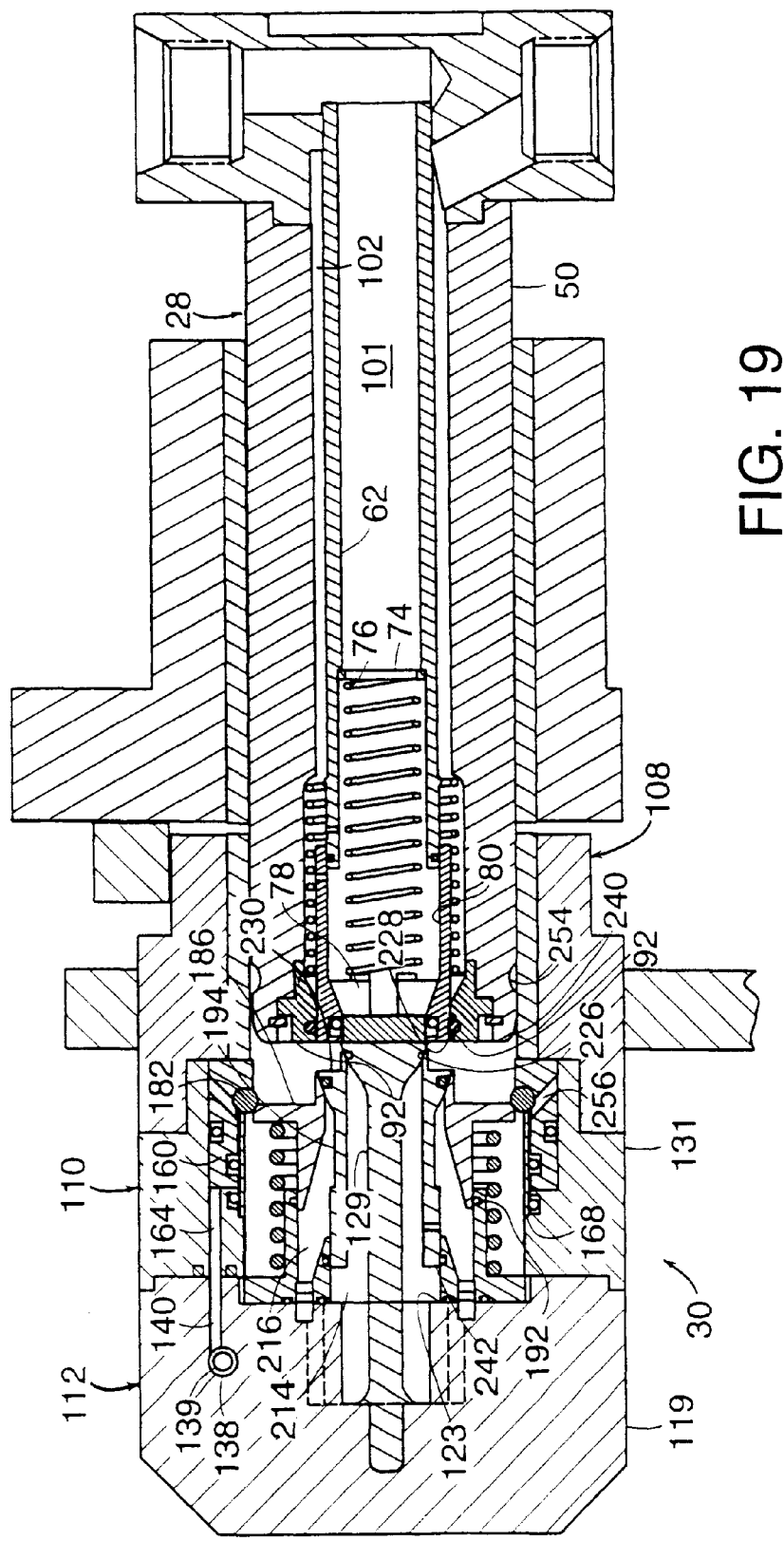
FIGS. 19–22 are sequential longitudinal section views illustrating the latch pin connecting with the latch bracket to form two fluid connections.

With latch pin in the position shown in FIG. 19, latch bracket inner sleeve 194 has slid proximally to a point where aperture 199 again provides a connection between inner and outer fluid channels 214, 216 in latch bracket. Similarly, latch pin inner sleeve 80 has moved to a position where aperture 87A communicates between central and outer fluid channels 101, 102 in latch pin 28. All fluid channels are sealed in both latch bracket 30 and latch pin 28 such that fluid cannot leak out.

At this point, latch pin 28 is still within latch bracket 30, and so the tool is still securely attached to tool coupler 10. When latch pin 28 is fully withdrawn from latch bracket 30, the operator can rotate tool coupler 10 away from the tool and disengage hooks 24, as described in U.S. Pat. No. 5,727,342.

It is apparent from the above description that latch pin 28 and latch bracket 30 would be capable of rotating relative to each other about their common longitudinal axis were they not attached to tool coupler 10 or grapple 22, respectively. Both latch pin 28 and latch bracket 30 have a high degree of rotational symmetry about their common central axis. Central and outer channels 101, 102 in latch pin body 50 are substantially concentric throughout their lengths. Similarly, inner and outer channels 214, 216 in latch bracket 30 are also substantially concentric. O-rings 64, 84, 87, 95, 190 and 200 are all concentric with the central axis, and permit relative rotation of the parts that they respectively seal. Ball bearings 182 enable latch pin body 50 to rotate relative to latch bracket 30. Moreover, most internal surfaces are bathed in hydraulic oil, which lubricates moving parts.

This rotational capability allows, the invention to provide a rotatable, multi-line fluid connector. The described connector can be employed in a coupling mechanism to a rotatable tool, such as a rotatable hanging grapple. The rotation feature can be enhanced by inserting bearing rings in strategic locations, such as between washer 47 and shoulder 72, between coil spring 193 and flange distal facing surface 191 of latch bracket middle sleeve 186, and between coil spring 88 and shoulder 248 of latch pin body 50.

While in the above described embodiment the hydraulic grapple includes a double action hydraulic cylinder 42, the described tool coupler 10 can also be employed to engage tools having one or more single action hydraulic cylinders or tools having no hydraulic cylinders. When employing a tool with one single action cylinder, a plug would be inserted in one of ports 52A, 52B, and the other of ports 52A, 52B on latch bracket 30 would be connected to the hydraulic cylinder. Tools not having any hydraulics could include a latch bracket without hydraulic connector parts, as described in U.S. Pat. No. 5,727,342, instead of latch bracket 30.

It should also be understood that the fluid connecting parts in latch pin 28 can be incorporated into latch bracket 30, and the fluid connecting parts in latch bracket can be incorporated into latch pin 28. For example plunger 129, latch bracket inner sleeve 194, latch bracket middle sleeve 186 and backing piece 142 could be located in a latch pin, while plug 78, tube 62, pin inner sleeve 80 and pin outer sleeve 92 could be incorporated into a latch bracket.

It will be apparent to those of skill in the art that the above described embodiment of a multi-line fluid connector, which includes two fluid lines, is constructed with features that are applicable to the design and construction of fluid connectors with more than two fluid lines according to the invention. Among these features are concentric fluid lines, make-before-break seals, and spring assisted closures.

The multi-line fluid connector of the invention can be used in couplers having a latching member that is different from a cylindrical latch pin. The multi-line fluid connector can be employed in fields outside of the construction equipment industry, and with fluids other than hydraulic fluids.

Other embodiments are within the scope of the following claims.

What is claimed is:

1. A latch bracket for attachment to a hydraulically operated tool having a hydraulic mechanism, the latch bracket comprising a first fluid channel extending therethrough, a first port coupled to the first fluid channel for coupling the first fluid channel to the hydraulic mechanism, wherein the latch bracket is adapted to receive a male latch pin on a tool coupler to lock the tool to the tool coupler and to couple the first fluid channel to a source of hydraulic pressure through the latch pin.

2. The latch bracket of claim 1, further comprising a second fluid channel extending through the latch bracket and a second port coupled to the second fluid channel for coupling the second fluid channel to the hydraulic mechanism, wherein the latch bracket is further adapted to couple the second fluid channel to a second source of hydraulic pressure through the latch pin.

3. The latch bracket of claim 2, wherein the second fluid channel comprises an outer fluid channel concentrically surrounding the first fluid channel.

4. The latch bracket of claim 3, wherein the first fluid channel comprises a substantially annular inner fluid channel.

5. The latch bracket of claim 4, further comprising an inner proximal o-ring positioned to provide a seal at a proximal end of the inner channel of the latch bracket and an outer proximal o-ring positioned to provide a seal at a proximal end of the outer channel of the latch bracket when a latch pin is disconnected from the latch bracket, the inner proximal o-ring and the outer proximal o-ring being arranged to unseal when a latch pin is connected to the latch bracket.

6. The latch bracket of claim 5, further comprising:

a body, including a cylindrical bearing at a proximal end adapted to receive and guide the latch pin, and an end cap at a distal end;

an elongated plunger extending proximally from the body a first distance, including an outwardly sloped surface near a proximal end, and a proximal end face that first contacts a distal end of the latch pin when the latch pin is inserted into the cylindrical bearing, wherein the outwardly sloped surface comprises an o-ring groove in which the inner proximal o-ring is positioned;

a substantially annular inner section member extending proximally from the body a second distance that is less than the first distance, wherein the inner section member includes a cylindrical surface and is arranged substantially concentrically around the plunger providing a gap therebetween;

a substantially annular outer section member extending proximally from the body a third distance that is less than the first distance and greater than the second distance, wherein the outer section member includes a cylindrical surface and is arranged concentrically around the inner section member providing a gap therebetween;

an inner sleeve, comprising: an inner surface having an outwardly sloped portion at a proximal end adapted to fit against the outwardly sloped surface of the plunger, the first proximal o-ring providing a seal therebetween when the latch bracket is disconnected from the latch pin; an outer surface having an outwardly sloped portion near a distal end that includes an o-ring groove in which the outer proximal o-ring is positioned; and a cylindrical surface at a distal end that slidingly engages with the cylindrical surface of the inner section member, wherein the inner channel is defined by the plunger, an inner surface of the inner section member and the inner surface of the inner sleeve;

a inner middle o-ring providing a seal between the cylindrical surface of the inner section member and the cylindrical surface of the bracket inner sleeve;

a second sleeve, comprising: an inner surface having an outwardly sloped portion at a proximal end adapted to fit against the outwardly sloped surface of the outer surface of the inner sleeve, the outer proximal o-ring providing a seal therebetween when the latch bracket is disconnected from the latch pin; and a cylindrical surface at a distal end that slidingly engages with the cylindrical surface of the inner section member, wherein the outer channel is defined by an outer surface of the inner section member, the outer surface of the inner sleeve, the inner surface of the second sleeve, and an inner surface of the outer section member;

an outer middle o-ring arranged to seal between the cylindrical surface of the outer section member and the cylindrical surface of the second sleeve; and a bias member arranged to urge the second sleeve proximally against the inner sleeve and the inner sleeve against the plunger.

7. The latch bracket of claim 6, further comprising a locking mechanism that inhibits the latch pin from retracting out from the latch bracket while fluid pressure is applied through the latch pin to the latch bracket.

8. The latch bracket of claim 7, wherein the locking mechanism includes:

a shuttle valve having first and second inlets coupled to the inner and outer channels, respectively, and an outlet;

an outer sleeve arranged adjacent a middle section of the body which is located between the end cap and the cylindrical bearing, the outer sleeve and the middle section defining an annular chamber coupled therebetween, the outer sleeve comprising an inner cylindrical surface having a diameter approximately the diameter of the cylindrical bearing to receive a distal end of the latch pin;

a fluid channel connecting between the outlet and a distal end of the chamber;

an annular shaped locking block within the annular chamber that is arranged to slide longitudinally therein to a proximal position when fluid pressure is applied to the chamber through the output; and a plurality of locking members arranged to extend radially inward from the inner cylindrical surface of the outer sleeve when the locking block moves to the proximal position to engage the locking members in an annular groove formed on an outer surface of the latch pin.

9. The latch bracket of claim 2, further comprising a fluid switch between the first fluid channel and the second fluid channel that closes when the latch pin is connected to the latch bracket to equalize pressures between the first fluid channel and the second fluid channel, and that opens when the latch pin is connected to the latch bracket.

10. The latch bracket of claim 6, further comprising a backing piece that includes the inner section member, the outer section member and an opening therebetween, wherein the backing piece is capable of moving a small lateral distance from a central axis of the latch bracket.

* * * * *

UNITED STATES PATENT AND TRADEMARK OFFICE
CERTIFICATE OF CORRECTION

PATENT NO. : 6,230,740 B1
DATED : May 15, 2001
INVENTOR(S) : Lee A. Horton and Arthur A. Erickson It is certified that error appears in the above-identified patent and that said Letters Patent is hereby corrected as shown below:

City of residence for the inventor Lee A. Horton: Jefferson, MA

Signed and Sealed this

Twenty-seventh Day of November, 2001

*Attest:*

NICHOLAS P. GODICI
*Attesting Officer*     *Acting Director of the United States Patent and Trademark Office*